(12) United States Patent
Sa et al.

(10) Patent No.: US 11,312,009 B2
(45) Date of Patent: Apr. 26, 2022

(54) ACTION ROBOT

(71) Applicant: LG ELECTRONICS INC., Seoul (KR)

(72) Inventors: Jaecheon Sa, Seoul (KR); Namjin Kim, Seoul (KR); Sanghun Kim, Seoul (KR); Youngeun Kim, Seoul (KR); Jideok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 16/599,499

(22) Filed: Oct. 11, 2019

(65) Prior Publication Data
US 2020/0368916 A1 Nov. 26, 2020

(30) Foreign Application Priority Data

May 21, 2019 (KR) ................. PCT/KR2019/006075

(51) Int. Cl.
*B25J 9/10* (2006.01)
*B25J 9/00* (2006.01)

(52) U.S. Cl.
CPC ............. *B25J 9/104* (2013.01); *B25J 9/0009* (2013.01)

(58) Field of Classification Search
CPC ........... B25J 9/0009; B25J 9/104; A63H 3/46; A63H 13/02; A63H 13/04
See application file for complete search history.

(56) References Cited

U.S. PATENT DOCUMENTS

| | | | |
|---|---|---|---|
| 9,707,487 B2 * | 7/2017 | Chan | A63H 13/06 |
| 2015/0165621 A1 | 6/2015 | Ko et al. | |
| 2016/0052129 A1 | 2/2016 | Ekas | |
| 2016/0167222 A1 | 6/2016 | Ead | |
| 2017/0162088 A1 * | 6/2017 | Kasuga | A63H 3/36 |
| 2018/0140441 A1 * | 5/2018 | Poirters | A61F 2/72 |
| 2018/0221779 A1 * | 8/2018 | Kasuga | A63H 31/10 |

FOREIGN PATENT DOCUMENTS

| | | | |
|---|---|---|---|
| CN | 102941573 A | | 2/2013 |
| CN | 106826850 A | * | 6/2017 |
| KR | 10-1250043 B1 | | 4/2013 |
| KR | 10-2013-0106970 A | | 10/2013 |
| KR | 10-1510019 B1 | | 4/2015 |
| KR | 10-2017-0047238 A | | 5/2017 |

* cited by examiner

*Primary Examiner* — Bobby Rushing, Jr.
(74) *Attorney, Agent, or Firm* — Birch, Stewart, Kolasch & Birch, LLP

(57) ABSTRACT

An action robot includes a connector configured to connect a body to a movable part, a joint including a rotational body fastened to the movable part, a joint shaft provided to protrude from the rotational body, and a joint shaft supporting part provided in the connector to have a ring shape, the joint shaft being inserted into the joint shaft, a wire connected to the movable part to pull the movable part in a direction in which the joint is bent, a wire path provided in the connector, the wire path including an inlet which is disposed in the body and through which the wire passes, and a supporter disposed in the body to support the wire. An upper end of the supporter overlaps the inlet in a horizontal direction.

18 Claims, 21 Drawing Sheets

ACTION ROBOT

CROSS-REFERENCE TO RELATED APPLICATIONS

This application claims the benefit of the Patent Application No. PCT/KR2019/006075 filed on May 21, 2019, which is hereby incorporated by reference as if fully set forth herein.

BACKGROUND

The present disclosure relates to an action robot, and more particularly, to an action robot including at least one joint.

As robot technology advances, a method of modularizing joints or wheels to manufacture a robot is being used. For example, various types of robots such as puppies, dinosaurs, humans, and spiders may be manufactured by electrically and mechanically connecting and assembling a plurality of actuator modules configuring a robot.

A robot capable of being manufactured by assembling a plurality of actuator modules is generally referred to as a modular robot. Each actuator module configuring a modular robot includes a motor, and thus, a motion of a robot is performed based on a rotation of the motor. Such a motion of a robot is a concept which denotes motions of a robot such as an action and dance.

Recently, robots for entertainments are attracting much attention, and thus, interest in robots for arousing the interest of persons or recreation is increasing. For example, technologies for allowing a user to dance according to music or take a motion or expression according to story (children's story and the like) are being developed.

This denotes that a plurality of motions based on music or children's story are previously set, and when the music or the children's story is reproduced by an external device, an action robot performs a motion by executing a motion previously set based thereon.

SUMMARY

An aspect of the present disclosure is directed to providing an action robot for preventing a wire from being damaged.

Another aspect of the present disclosure is directed to providing an action robot in which a wire is easily guided in a body of a figure.

To achieve these and other advantages and in accordance with the purpose of the disclosure, as embodied and broadly described herein, there is provided an action robot including: a connector configured to connect a body to a movable part; a joint including a rotational body fastened to the movable part, a joint shaft provided to protrude from the rotational body, and a joint shaft supporting part provided in the connector to have a ring shape, the joint shaft being inserted into the joint shaft; a wire connected to the movable part to pull the movable part in a direction in which the joint is bent; a wire path provided in the connector, the wire path including an inlet which is disposed in the body and through which the wire passes; and a supporter disposed in the body to support the wire, wherein an upper end of the supporter overlaps the inlet in a horizontal direction.

A perimeter of the inlet may be chamfered.

An internal diameter of the inlet may be greater than an internal diameter of the wire path.

The connector may be provided as a pair of connectors respectively disposed at both sides of the body, and the upper end of the supporter may be disposed between inlets of the pair of connectors.

The wire may pass through a region between the supporter and one of the pair of connectors and may enter an inlet provided in the other connector.

The supporter may have a roller shape.

The action robot may further include a tube embedded into the body to guide the wire, the tube including a flexible material.

The action robot may further include an inner frame disposed in the body, the supporter and the tube being mounted on the inner frame.

The tube may be provided in plurality, some of the plurality of tubes may be mounted on a front portion of the inner frame, and the other some thereof may be mounted on a rear portion of the inner frame.

A guide groove for guiding the wire passing through the tube to the supporter may be provided in the inner frame.

The action robot may further include an inner cover body fastened to the inner frame to cover the supporter at a front region.

A guide groove for guiding the wire passing through the tube to the supporter may be provided in the inner cover body.

The action robot may further include a connector wire configured to rotate the connector with respect to the body.

The connector wire may be apart from the supporter.

The tube may be provided in plurality, the wire may pass through one of the plurality of tubes, and the connector wire may pass through one other tube.

A rear hole through which the connector wire passes may be provided in the inner frame, and a front hole, which is disposed in front of the rear hole and through which the connector wire passes, may be provided in the inner cover body.

The connector may be connected to a portion between the rear hole and the front hole in a lengthwise direction of the connector wire.

The action robot may further include an elastic member configured to pull the connector wire.

The tube may be provided in plurality, the connector wire may pass through one of the plurality of tubes, and the elastic member may be disposed to surround one other tube.

The action robot may further include a sub-supporter disposed between the tube and the supporter in a lengthwise direction of the wire to support the wire.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, detailed embodiments will be described in detail with reference to the accompanying drawings.

Figure 1:
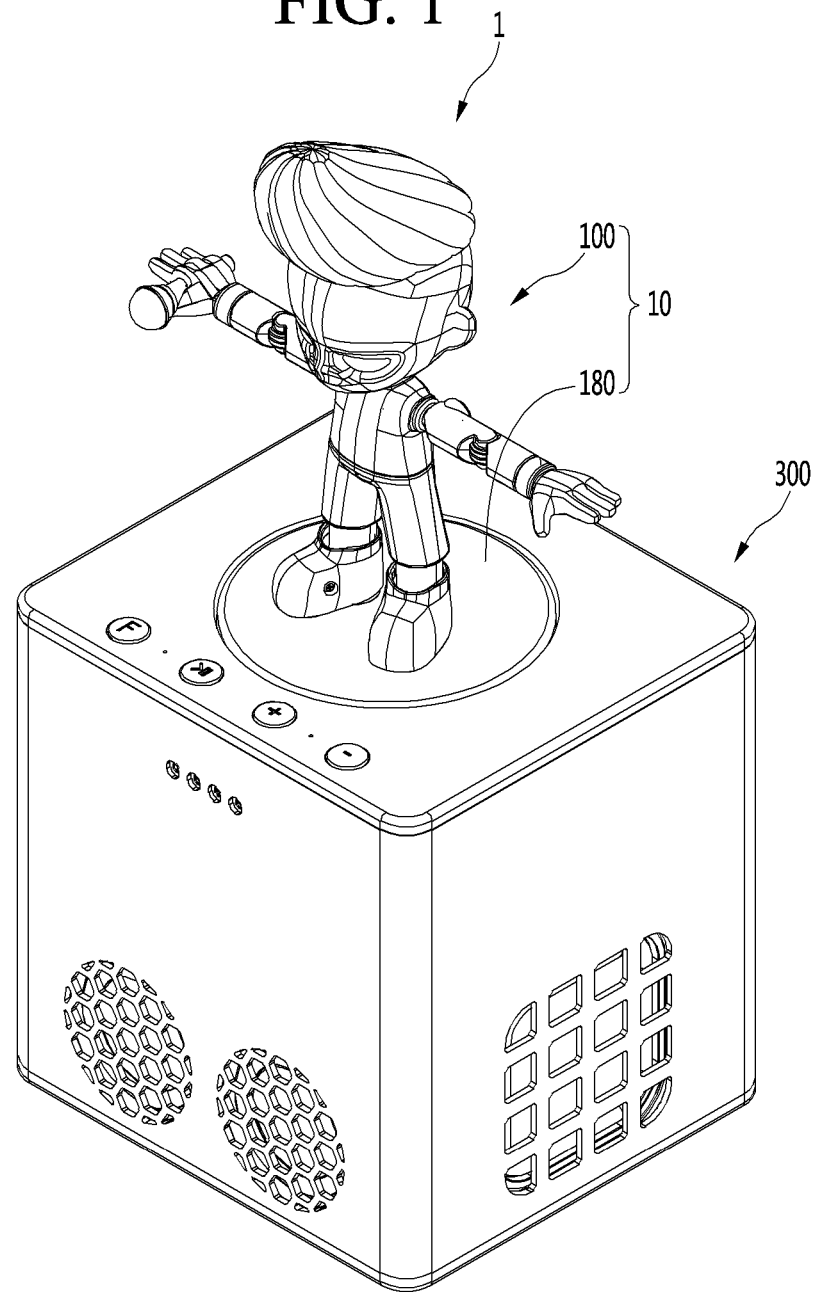
FIG. 1 is a perspective view of an action robot according to an embodiment.
Figure 2:
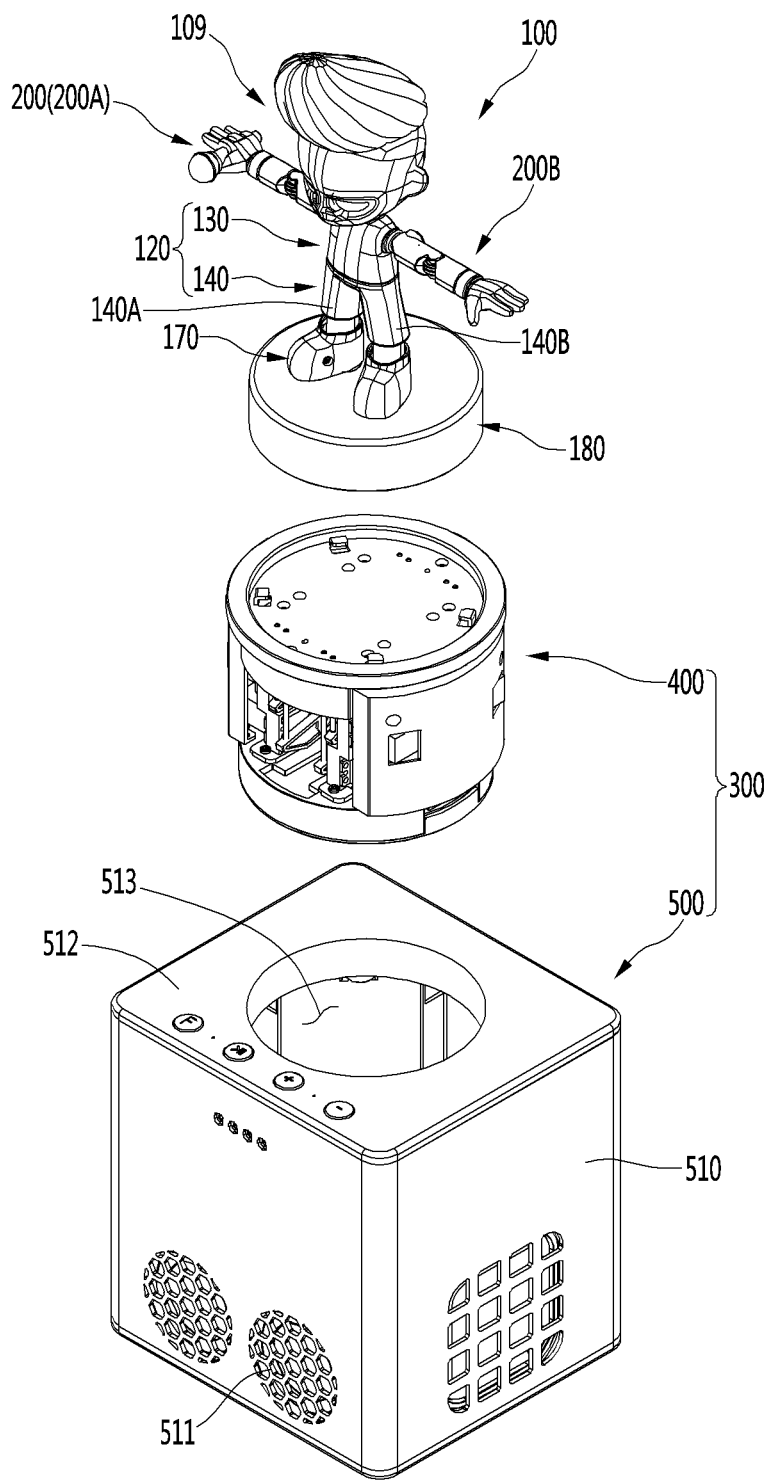
FIG. 2 is an exploded perspective view of an action robot according to an embodiment.
Figure 3:
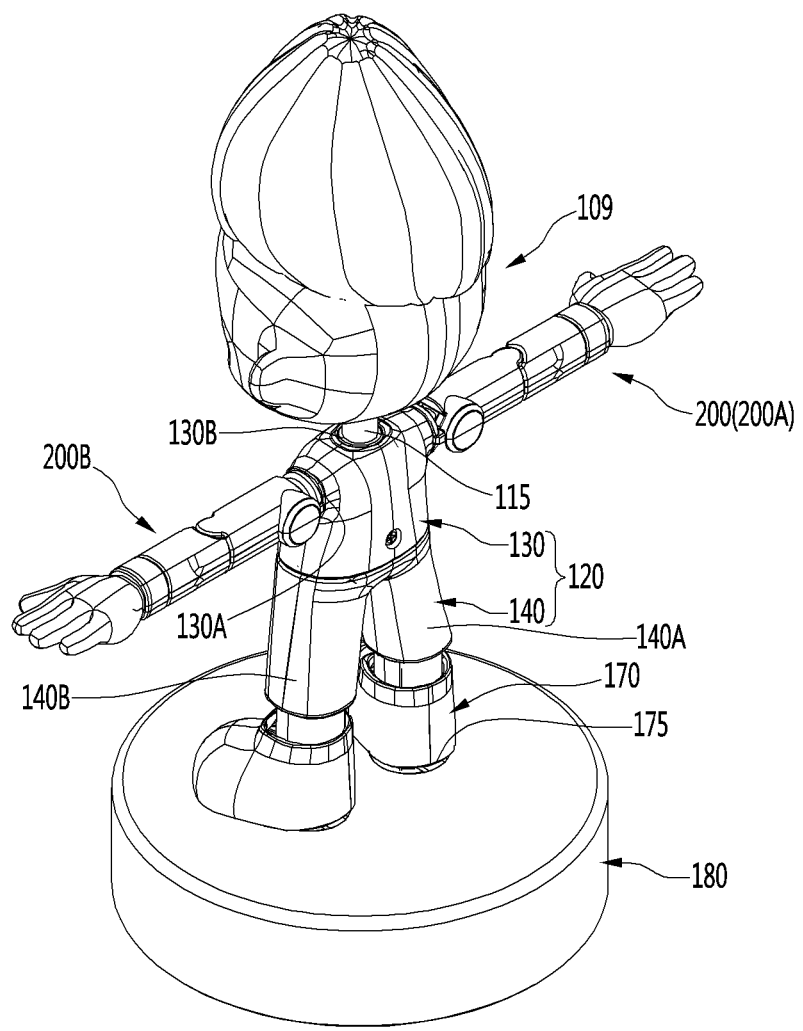
FIG. 3 is a diagram when a figure module according to an embodiment is seen from a rear region.

FIG. 1 is a perspective view of an action robot 1 according to an embodiment, FIG. 2 is an exploded perspective view of an action robot according to an embodiment, and FIG. 3 is a diagram when a figure module according to an embodiment is seen from a rear region.

The action robot 1 according to an embodiment may include a figure module 10 and a base module which supports the figure module at a lower side.

The figure module 10 may include a figure 100 and a figure base 180 which supports the figure 100 at a lower side.

The figure 100 may have a shape similar to that of a human body. However, the present disclosure is not limited thereto, and the figure 100 may have a shape of an animal or the like.

The figure 100 may include a head unit 109, a body 120, a movable assembler 200, and a foot 170. Herein, an example where the figure 100 has a shape of a person will be described. Hereinafter, therefore, the movable assembler 200 may be referred to as an arm assembler 200.

The head unit 109 may have a shape corresponding to a head of a person. The head unit 109 may be connected to an upper side of the body 120. The head unit 109 may include a supporting bar 115 connected to the body 120. The supporting bar 115 may correspond to a neck of a human body.

The body 120 may have a shape corresponding to a human body. The body 120 may be fixed and may not move. A space where various components are embedded may be provided in the body 120.

The body 120 may include an upper body 130 and a lower body 140.

An internal space of the upper body 130 may communicate with an internal space of the lower body 140.

The upper body 130 may have a shape corresponding to an upper half of a human body. The arm assembler 200 may be connected to the upper body 130. An arm assembly connection hole 130A connected to the arm assembler 200 may be provided in both sides of the upper body 130.

Moreover, a head connection hole 130B connected to the head unit 109 may be provided in an upper portion of the upper body 130. The supporting bar 115 may pass through the head connection hole 130B.

The lower body 140 may have a shape corresponding to a lower half of a human body. The lower body 140 may include a pair of legs 140A and 140B.

The upper body 130 and the lower body 140 may be detachably fastened to each other. Therefore, an assembly of the body 130 may be simplified, and moreover, components disposed in the body 130 may be easily maintained.

The arm assembly 200 may be connected to both sides of the body 120. In more detail, a pair of arm assemblies 200 may be respectively connected to both sides of the upper body 130.

The pair of arm assemblies 200 may include a right arm assembly 200A corresponding to a right arm of a person and a left arm assembly 200B corresponding to a left arm of a person. Each of the right arm assembly 200A and the left arm assembly 200B may independently move.

The arm assembly 200 may be rotate with respect to the body 120.

The foot 170 may be connected to a lower portion of the lower body 140, namely, a lower portion of each of the pair of legs 140A and 140B. The foot 170 may be supported by the figure base 180.

A portion of a lower end of the foot 170 may be spaced apart from an upper surface of the figure base 180 to provide an inclined portion 175 which forms a certain interval. The inclined portion 175 may be provided at a rear lower end of the foot 170. Accordingly, the foot 170 may move while nodding with respect to the figure base 180.

The figure base 180 may support the foot 170 at a lower side. The figure base 180 may be fastened to the base module 300 at an upper side of the base module 300.

The figure base 180 may have an approximately cylindrical hollow shape.

The base module 300 may support the figure module 10 at a lower side. In more detail, the base module 300 may support the figure base 180 at a lower side.

The figure base 180 may be detachably fastened to the base module 300.

The base module 300 may include a driving module 400 and a sound module 500.

The driving module 400 may be disposed under the figure module 10. The driving module 400 may be fastened to the figure module 10, and in more detail, may be fastened to the figure base 180.

The driving module 400 may be embedded into the sound module 500.

The driving module 400 may drive the figure module 10. The driving module 400 may include a controller which controls an overall operation of the figure module 10 and a driving mechanism which operates the figure module 10, and the controller and the driving mechanism may be embedded into the driving module 400.

The sound module 500 may configure an external appearance of the base module 300.

The sound module 500 may include a housing 510, a top cover 512, and a speaker (not shown).

The housing 510 may have a box shape where an upper surface thereof is approximately opened. The driving module 400 may be disposed in the housing 510.

The top cover 512 may cover the opened upper surface of the housing 510.

An open hole 513 which an upper portion and a lower portion thereof are opened may be provided in the top cover 512. The figure base 180 may be disposed in the open hole 513. That is, a size and a shape of the open hole 513 may correspond to the figure base 180. The open hole 513 may have a size which allows the driving module not to pass through the open hole 513.

The speaker may be embedded into the housing 510. A plurality of sound holes 511 through which a sound of the speaker is discharged may be provided in the housing 510.

The figure 100 may move according to a sound output from the speaker of the sound module 500. The figure 100 may be set to perform an action which differs for each sound output from the speaker.

Figure 4:
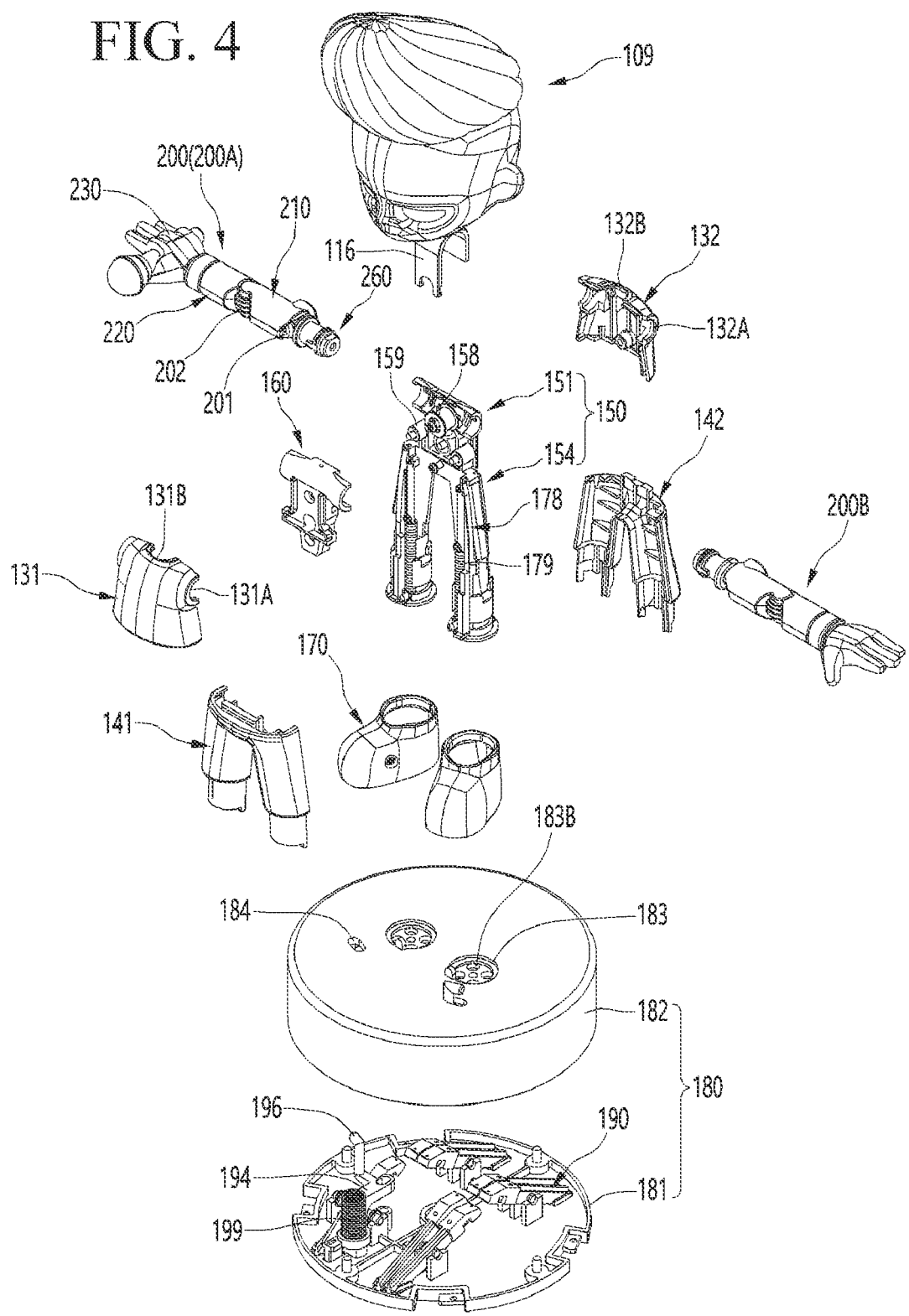
FIG. 4 is an exploded perspective view of a figure module according to an embodiment.

FIG. 4 is an exploded perspective view of a figure module according to an embodiment.

At least one of the upper body 130 and the lower body 140 of the figure 100 may include a front body 131 and 141 and a rear body 132 and 142 which is detachably fastened to a rear portion of the front body 131 and 141.

For example, the upper body 130 may include a front upper body 131 and a rear upper body 132 which are fastened to each other so as to be detached from each other in a forward-rearward direction. An internal space of the upper body 130 may be provided between the front upper body 131 and the rear upper body 132. Also, the lower body 140 may include a front lower body 141 and a rear lower body 142 which are fastened to each other so as to be detached from each other in a forward-rearward direction. An internal space of the lower body 140 may be provided between the front lower body 141 and the rear lower body 142.

A first arm assembly connection groove 131A may be provided in both sides of the front upper body 131, and a second arm assembly connection groove 132A may be provided in both sides of the rear upper body 132. When the front upper body 131 and the rear upper body 132 are fastened to each other, the first arm assembly connection groove 131A and the second arm assembly connection groove 132A may form an arm assembly connection hole 130A (see FIG. 3) together.

A first head connection groove 131B may be provided in an upper portion of the front upper body 131, and a second head connection groove 132B may be provided in an upper portion of the rear upper body 132. When the front upper body 131 and the rear upper body 132 are fastened to each other, the first head connection groove 131B and the second head connection groove 132B may form a head connection hole 130B (see FIG. 3) together.

The head 30 may include a head fixing part 116 which is fastened to at least one of an inner frame 150 and an inner cover body 160 to be described below. The head fixing part 116 may be disposed in the upper body 130. In more detail, the head fixing part 116 may be disposed between the front upper body 131 and the rear upper body 132.

The head fixing part 116 may be provided as one body with a supporting bar 115 (see FIG. 3) of the head unit 109, or may be fastened to the supporting bar 115. Therefore, the head unit 109 may be solidly fastened to the body 130.

The arm assembly 200 may include an upper arm part 210, a lower arm part 220, and a hand part 230. Also, the arm assembly 200 may include at least one joint 201 and 202. In more detail, the arm assembly 200 may include a shoulder joint 201 and an elbow joint 202.

Since the arm assembly 200 includes at least one joint 201 and 202, the arm assembly 200 may implement various operations. That is, the upper arm part 210 and the lower arm part 220 may each be a movable part which moves by using the joint 201 and 202.

The upper arm part 210 may correspond to a portion between a shoulder and an elbow in an arm of a person. The lower arm part 220 may correspond to a portion between an elbow and a wrist in an arm of a person. The hand part 230 may correspond to a hand and a wrist of a person.

The shoulder joint 201 may rotate the upper arm part 210 with respect to the body 120. The upper arm part 210 may rotate based on the shoulder joint 201 to open or close an armpit.

The elbow joint 202 may rotate the lower arm part 202 with respect to the upper arm part 210. The lower arm part 220 may rotate based on the elbow joint 202 to fold or unfold an elbow.

The arm assembly 200 may further include a connector 260 connected to the body 120. The connector 260 may connect the shoulder joint 201 to the body 120.

The connector 260 may be rotatably connected to the body 120. That is, the connector 260 may rotate the shoulder joint 201 and the upper arm part 210 with respect to the body 120. In this case, a rotational shaft of the connector 260 may be vertical to a rotational shaft of the shoulder joint 201. In more detail, the rotational shaft of the shoulder joint 201 may be provided long in a forward-rearward direction, and the rotational shaft of the connector 260 may be provided long in a left-right direction.

An operation where a whole portion of the arm assembly 200 rotates based on the connector 260 to turn an arm may be performed.

The right arm assembly 200A and the left arm assembly 200B may have the same configuration.

The figure 100 may further include the inner frame 150. The inner frame 150 may be disposed in the body 120.

The inner frame 150 may perform a function of a frame of the FIG. 100.

The inner frame 150 may support the head unit 109 and the arm assembly 200.

The inner frame 150 may include a body frame 151 of which at least a portion is disposed in the upper body 130 and a pair of leg frames 154 of which at least a portion is disposed in the lower body 140 and which is connected to the body frame 151.

The body frame 151 and the leg frame 154 may be provided as one body. However, the present disclosure is not limited thereto.

A lower end of the leg frame 154 may be fastened to the figure base 180. The foot 170 may surround a portion of a lower side of the leg frame 154.

A detailed configuration of the inner frame 150 will be described below in detail.

The FIG. 100 may further include a tube 178. The tube 178 may be disposed in the body 120, and in more detail, may be disposed in the lower body 140. The tube 178 may be equipped in the inner frame 150. In more detail, the tube 178 may be equipped in the leg frame 154.

The tube 178 may be disposed long in an upward-downward direction.

The tube 178 may include a flexible material. Therefore, the tube 178 may be easily equipped in the leg frame 154 with being bent. The tube 178 may guide a wire W (see FIG. 9) which drives the figure 100. The wire W will be described below in detail.

The tube 1768 may be provided in plurality. Each of the plurality of tubes 178 may guide one wire W.

The figure 100 may further include an elastic member 179. The elastic member 179 may be disposed in the body 120, and in more detail, may be disposed in the lower body 140. The elastic member 179 may be equipped in the inner frame 150. In more detail, the elastic member 179 may be equipped in the leg frame 154.

The elastic member 179 may be a coil spring. The elastic member 179 may be disposed long in a vertical direction. The elastic member 179 may be disposed to surround a portion of a lower portion of an outer perimeter of the tube 178.

The elastic member 179 may be connected to a wire W3 (see FIG. 9) which rotates the connector 260 of the arm assembly 200. This will be described below in detail.

The FIG. 100 may further include a plurality of wire supporters 158 and 159.

The wire supporters 158 and 159 may support the wire. In more detail, the wire W passing through the tube 178 may contact the wire supporters 158 and 159. Therefore, the wire W may be tightly maintained by a tension.

The wire supporters 158 and 159 may be equipped in the inner frame 150. The wire supporters 158 and 159 may be equipped in a front portion of the inner frame 150.

In more detail, the wire supporters 158 and 159 may be mounted on the body frame 151. The wire supporters 158 and 159 may be fixed to the inner frame 150, or may be rotatable equipped in the inner frame 150.

The wire supporters 158 and 159 may each have an approximately cylindrical hollow shape. The wire supporters 158 and 159 may be provided long in a forward-rearward direction.

The wire supporters 158 and 159 may include a main supporter 158 and a sub-supporter 159. The sub-supporter 159 may be provided as a pair of sub-supporters which are spaced apart from each other in a horizontal direction.

A diameter of the main supporter 158 may be greater than that of the sub-supporter 159.

The main supporter 158 may be disposed more upward from the sub-supporter 159. That is, a vertical distance from an upper end of the inner frame 150 to the main supporter may be shorter than a vertical distance from an upper end of the inner frame to the sub-supporter.

With respect to a horizontal direction, the main supporter 158 may be provided at a center portion of the inner frame 150, and the sub-supporter 159 may be provided at a side portion of the inner frame 150.

The figure 100 may further include an inner cover body 160.

The inner cover body 160 may be fastened to the inner frame 150.

The inner cover body 160 may be fastened to the inner frame 150, and in more detail, may be fastened to a front portion of the body frame 151.

The inner cover body 160 may prevent the wire supporters 158 and 159 equipped in the inner frame 150 from deviating therefrom in a forward direction.

The inner cover body 160 may be disposed in the body 120. The inner cover body 160 may be disposed between the inner frame 150 and the front upper body 131.

The inner cover body 160 may support the head unit 109 and the arm assembly 200 along with the inner frame 150.

The figure base 180 may include a lower plate 181 and a base cover 182.

The lower plate 181 may have an approximately discal shape. The lower plate 181 may configure a lower surface of the figure base 180.

The base cover 182 may include an internal space provided therein, and the lower surface thereof may be open. The base cover 182 may cover the lower plate 181 at a lower side. The base cover 182 may configure a perimeter surface and an upper surface of the figure base 180.

A fastening groove 183 to which inner frame 150 (in more detail, a lower end of the leg frame 154) is fastened may be provided in an upper surface of the base cover 182. The fastening groove 183 may be provided as an upper surface of the base cover 182 is recessed downward.

A plurality of power transferors 190 and 194 for transferring a driving force of the driving module 400 to the figure 100 may be embedded into the figure base 180.

The plurality of power transferors 190 and 194 may include at least one of a seesaw lever 190 and a pusher 194. Hereinafter, a case where all of the seesaw lever 190 and the pusher 194 are embedded into the figure base 180 will be described for example.

At least one seesaw lever 190 may be embedded into the figure base 180. The seesaw lever 190 may be disposed on the lower plate 181 and may be covered by the base cover 182.

Each of each seesaw lever 190 may operate like seesaw. That is, when one end portion of the seesaw lever 190 is lowered, the other end portion thereof may be raised, and when the one end portion of the seesaw lever 190 is raised, the other end portion thereof may be lowered.

The wire W (see FIG. 9) may be connected to the one end portion of the seesaw lever 190. The other end portion of the seesaw lever 190 may be raised by the above-described driving module 400. Therefore, the one end portion of the seesaw lever 190 connected to the wire W may be lowered and may pull the wire W, thereby driving the figure 100.

A wire through hole 183B through which the wire W connected to the one end portion of the seesaw lever 190 passes may be provided in the upper surface of the base cover 182. The wire through hole 183B may be provided in the fastening groove 183.

The wire W connected to the seesaw lever 190 may extend to the inside of the tube 178 which passes through the wire through hole 183B and is mounted on the inner frame 150.

The pusher 194 which upward pushes the foot 170 may be embedded into the figure base 180. The pusher 194 may be disposed on the lower plate 181 and may be covered by the base cover 182.

The pusher may be upward pressurized by the above-described driving module 400. Also, an inner elastic member 199 which provides a downward elastic force to the pusher 194 may be included in the figure base 180.

A through hole 184 through which the pusher 194 protrudes upward may be provided in the upper surface of the base cover 182. A portion of the pusher 194 may protrude to an upper side through the through hole 184 and may push the foot 170. Accordingly, a motion where the foot 170 nods the foot may be implemented.

Figure 5:
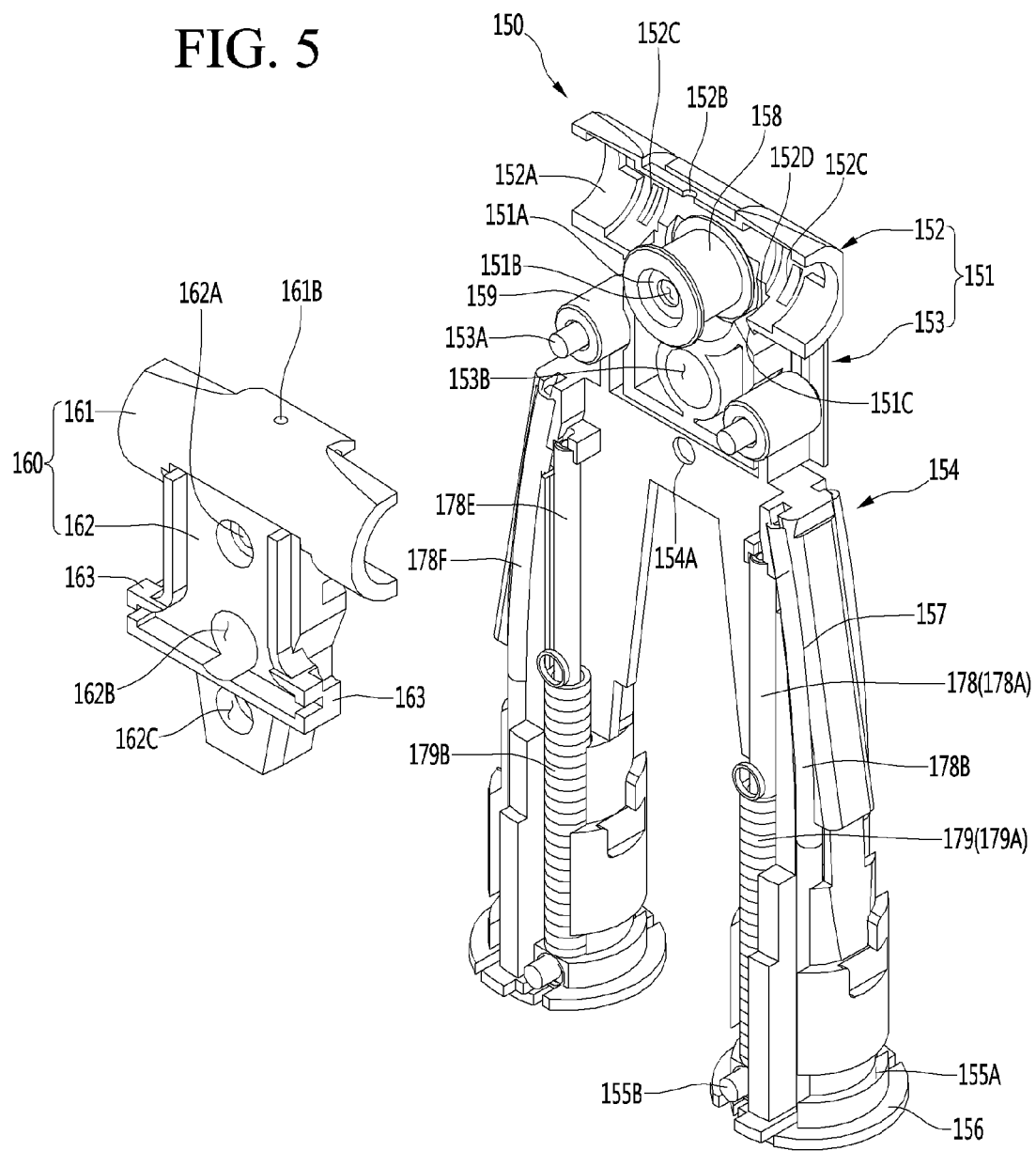
FIG. 5 is a perspective view of an inner frame and an inner cover body according to an embodiment.
Figure 6:
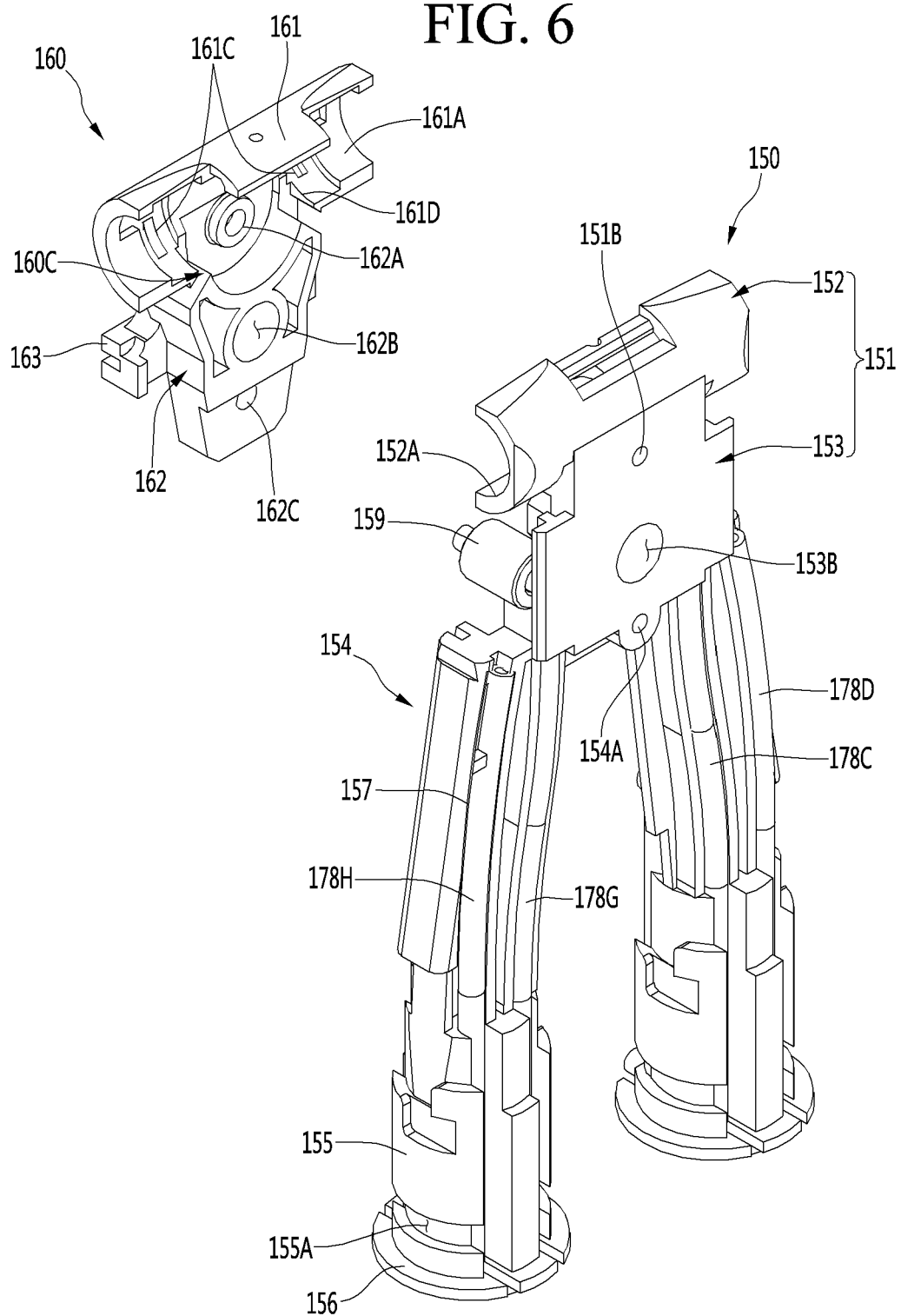
FIG. 6 is a diagram when an inner frame and an inner cover body according to an embodiment are seen from a rear region.
Figure 7:
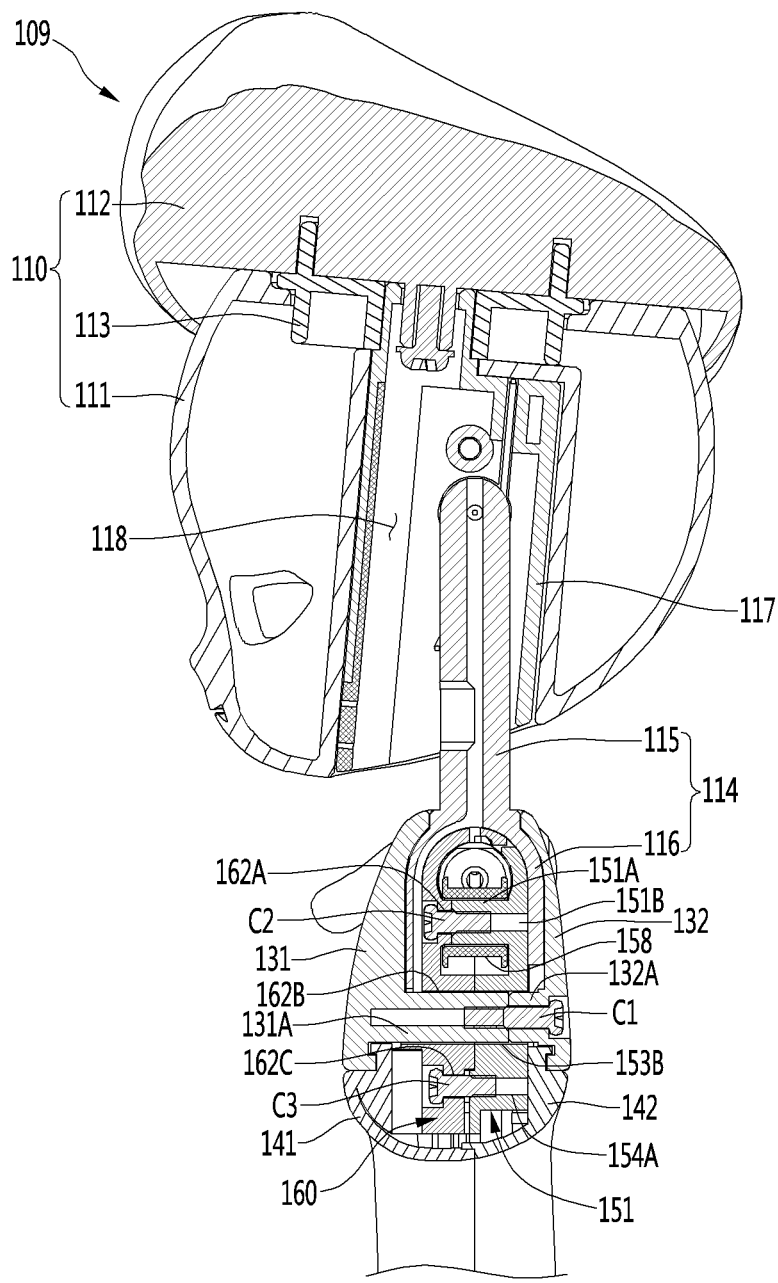
FIG. 7 is a cross-sectional view illustrating the inside of a figure according to an embodiment.

FIG. 5 is a perspective view of an inner frame and an inner cover body according to an embodiment, FIG. 6 is a diagram when an inner frame and an inner cover body according to an embodiment are seen from a rear region, and FIG. 7 is a cross-sectional view illustrating the inside of a figure according to an embodiment.

As described above, an inner frame 150 may include the body frame 151 and the pair of leg frames 154 connected to a lower portion of the body frame 151.

A main supporter mounting part 151A with the main supporter 158 mounted thereon may be provided in the body frame 151. The main supporter mounting part 151A may protrude in a forward direction from the body frame 151. The main supporter mounting part 151A may be inserted into a hollow portion provided in the main supporter 158.

The body frame 151 may include an upper frame 152 and a lower frame 153 connecting the upper frame 152 to the leg frame 154.

The upper frame 152 may be provided long in a horizontal direction. The upper frame 152 may have a shape where an approximately hollow cylinder is cut in a lengthwise direction. A front surface of the upper frame 152 may be open, and a rear surthce thereof may be provided to be convex in a rearward direction.

A rear hanging jaw 152A for preventing the arm assembly 200 from deviating therefrom in a horizontal direction may be provided in both end portions of the upper frame 152. The rear hanging jaw 152A may protrude in a radius inward direction from an inner surface of the upper frame 152.

A rear avoidance groove 152D for avoiding interference with the main supporter 158 may be provided in the upper frame 152. The rear avoidance groove 152D may be formed by cutting a center portion of a lower front portion of the upper frame 152.

The lower frame 153 may be disposed between the upper frame 152 and the leg frame 154.

A horizontal length of the lower frame 153 may be shorter than a horizontal length of the upper frame 152.

The upper frame 152, the lower frame 153, and the leg frame 154 may be provided as one body.

A sub-supporter mounting part 153A with the sub-supporter 159 mounted thereon may be provided in the lower frame 153. The sub-supporter mounting part 153A may protrude in a forward direction from the lower frame 153. The sub-supporter mounting part 153A may be inserted into a hollow portion provided in the sub-supporter 159.

The leg frame 154 may be provided long in a vertical direction. The leg frame 154 may be provided as a pair of leg frames 154.

A plurality of fitting grooves 157 on which the tube 178 is mounted may be provided in the leg frame 154. Each of the fitting grooves 157 may be provided long in a vertical direction. The fitting groove 157 may be provided to be bent, and the tube 178 may be bent and fitted to match a shape of the fitting groove 157. However, the present disclosure is not limited thereto, and the fitting groove 157 may be vertically provided and the tube 178 may be vertically fitted thereinto without being bent.

Some of the plurality of fitting, grooves 157 may be provided in a front portion of the leg frame 154. The other some fitting grooves 157 may be provided in a rear portion of the leg frame 154. That is, some of a plurality of tubes 178 may be mounted on the front portion of the leg frame 154, and the other some thereof may be mounted on the rear portion of the leg frame 154.

For example, the plurality of tubes 178 may include a first tube 178A, a second tube 178B, a third tube 178C, a fourth tube 178D, a fifth tube 178E, a sixth tube 178F, a seventh tube 178G, and an eighth tube 178H.

The first tube 178A and the second tube 178B may be disposed on a front surface of one leg frame 154 (for example, a left leg frame). That is, the first tube 178A and the second tube 178B may be disposed between the one leg frame 154 and the front lower body 141. Also, the first tube 178A may be disposed more inward than the second tube 178B.

The third tube 178C and the fourth tube 178D may be disposed on a rear surface of the other leg frame 154 (for example, a right leg frame). That is, the third tube 178C and the fourth tube 178D may be disposed between the other leg frame 154 and the rear lower body 142. Also, the third tube 178C may be disposed more inward than the fourth tube 178D.

The fifth tube 178E and the sixth tube 178F may be disposed on a front surface of the other leg frame 154. That is, the fifth tube 178E and the sixth tube 178F may be disposed between the other leg frame 154 and the front lower body 141. Also, the fifth tube 178E may be disposed more inward than the sixth tube 178F.

The seventh tube 1786 and the eighth tube 178H may be disposed on a rear surface of the one leg frame 154. That is, the seventh tube 178G and the eighth tube 178H may be disposed between the one leg frame 154 and the rear lower body 142. Also, the seventh tube 178G may be disposed more inward than the eighth tube 178H.

A rear hole 152C through which the wire W3 (see FIG. 9) for rotating the connector 260 of the arm assembly 200 passes may be provided in the upper frame 152. The rear hole 152C may be a long hole which is long provided in a dimeter direction of the upper frame 152. The rear hole 152C may be provided as a pair of rear holes 1520 which are spaced apart from each other in a horizontal direction. The pair of rear holes 152C may be disposed at opposite positions with respect to the main supporter 158.

The wire W3 (see FIG. 9) for rotating the connector 260 of the arm assembly 200 may pass through the tube 178 mounted on a rear portion of the leg frame 154, may pass through the rear hole 152C provided in the upper frame 152, and may be inserted into the upper frame 152.

A rear guide groove 151C which guides wires W1 and W2 (see FIG. 9) for rotating the shoulder joint 201 and the elbow joint 202 of the arm assembly 200 may be provided in the body frame 151. The rear guide groove 151C may be provided between the upper frame 152 and the lower frame 153. The rear guide groove 151C may be provided as a pair of rear guide grooves 151C which are spaced apart from each other in a horizontal direction. The pair of rear guide grooves 151 may be disposed at opposite positions with respect to the main supporter 158.

The wires W1 and W2 (see FIG. 9) for rotating the shoulder joint 201 and the elbow joint 202 of the arm assembly 200 may pass through the tube 178 mounted on the rear portion of the leg frame 154, may pass through the rear guide groove 151C, and may be inserted into the upper frame 152.

A pair of elastic members 179 may be mounted on the leg frame 154. Hereinafter, a case where the elastic member 179 is disposed in front of the leg frame 154 will be described for example, but the present disclosure is not limited thereto.

An upper end of the elastic member 179 may be connected to the wire W3 (see FIG. 9) which rotates the connector 260 of the arm assembly 200, and a lower end thereof may be fixed to the leg frame 154. In more detail, an elastic member fixing part 155B to which a lower end of the elastic member 179 is fixed may be provided under each of the leg frames 154.

Therefore, when a tension is applied to the wire W3, the wire W3 may upward pull the elastic member 179, and the elastic member 179 may extend. When the tension applied to the wire S3 is removed, the elastic member 179 may be contracted by a restoring force of the elastic member 179 and may downward pull the wire W3.

The pair of elastic members 179 may include a first elastic member 179A mounted on the one leg frame 154 and a second elastic member 179B mounted on the other leg frame 154.

The first elastic member 179A may surround a lower outer perimeter of the first tube 178A, and the second elastic member 179B may surround a lower outer perimeter of the fifth tube 178E.

The first elastic member 179A may be connected to the wire W3 which rotates the connector 260 of one arm assembly 200B, and the second elastic member 179B may be connected to the wire W3 which rotates the connector 260 of the other one arm assembly 200A. This will be described below in detail.

A foot connection groove 155A connected to the foot 170 may be provided in a lower portion of the leg frame 154. In more detail, the foot connection groove 155A may be provided long in a perimeter direction of a lower portion of the leg frame 154.

The foot connection groove 155A may be provided in each of a lower outer portion and a lower inner portion of the leg frame 154. The inner portion may denote a portion facing the other one leg frame 154, and the outer portion may denote a portion opposite to the inner portion.

A base fastening part 156 fastened to the figure base 180 may be provided at a lower end portion of the leg frame 154. In more detail, the base fastening part 156 may be inserted into the fastening groove 183 provided in the upper surface of the base cover 182.

The inner frame 160 may be fastened to the inner frame 150 in front of the inner frame 151.

The inner cover body 160 may include an upper cover body 161 and a lower cover body 162. The upper cover body 161 and the lower cover body 162 may be provided as one body.

The upper cover body 161 may be provided long in a horizontal direction. The upper cover body 161 may have a shape where an approximately hollow cylinder is cut in a lengthwise direction. A rear surface of the upper cover body 161 may be open, and a front surface thereof may be provided to be convex in a rearward direction.

The upper body 161 may have a shape approximately symmetrical with the upper frame 152. The upper cover body 161 may be fastened to the upper frame 152 to configure an arm assembly mounting part with the connector 260 of the arm assembly 200 mounted thereon. The arm assembly mounting part may have an approximately hollow cylindrical shape, and the connector 260 of each arm assembly 200 may be mounted on both ends.

A front hanging jaw 161A for preventing the arm assembly 200 from deviating therefrom in a horizontal direction may be provided in both end portions of the upper cover body 161. The front hanging jaw 161A may protrude in a radius inward direction from an inner surface of the upper cover body 161.

The front hanging jaw 161A may be provided at a position corresponding to the rear hanging jaw 152A provided in the upper frame 152. The front hanging jaw 161A may prevent the arm assembly 200 from deviating therefrom in a horizontal direction along with the rear hanging jaw 152A.

A front hole 161C through which the wire W3 (see FIG. 9) for rotating the connector 260 of the arm assembly 200 passes may be provided in the upper cover body 161. The front hole 161C may be a long hole which is long provided in a dimeter direction of the upper cover body 161. The front hole 161C may be provided as a pair of front holes 161C which are spaced apart from each other in a horizontal direction. The pair of front holes 161C may be disposed at opposite positions with respect to the main supporter 158.

The front hole 161C may forward and rearward face the rear hole 152C provided in the upper frame 152.

The wire W3 for rotating the connector 260 of the arm assembly 200 may pass through the front hole 161C provided in the upper cover body 161, may be unloaded to the outside of the upper cover body 161, and may be connected to the elastic member 179 mounted on the leg frame 154.

A front guide groove 160C, which guides the wires W1 and W2 (see FIG. 9) for rotating the shoulder joint 201 and the elbow joint 202 of the arm assembly 200, may be provided in the inner cover body 160. The front guide groove 160C may be provided between the upper cover body 161 and the lower cover body 162. The front guide groove 160C may be provided in a pair of front guide grooves 160C which are spaced apart from each other in a horizontal direction. The pair of front guide grooves 160C may be disposed at opposite positions with respect to the main supporter 158.

The wires W1 and W2 (see FIG. 9) for rotating the shoulder joint 201 and the elbow joint 202 of the arm assembly 200 may pass through the tube 178 mounted on a front portion of the leg frame 154, may pass through the front guide groove 160C, and may be inserted into the upper cover body 161.

The front guide groove 160C may communicate with a rear guide groove 150C provided in the body frame 151. The front guide groove 160C may provide a guide hole, through which the wires W1 and W2, along with the rear guide groove 150C.

An upper hole 161B through which the wire W passes may be provided in the upper cover body 161. The upper hole 161B may be provided in order for an upper surface of the upper cover body 161 to upward and downward pass therethrough. One wire W may be connected to the head unit 109 through the upper hole 161B and may drive the head unit 109.

An avoidance groove 152B disposed under the upper hole 161B may be provided in the upper frame 151. The avoidance groove 152B may prevent the wire W passing through the upper hole 161B from interfering with the upper frame 151. Instead of the avoidance groove 152B, an avoidance hole may be provided in the upper frame 161.

A front avoidance groove 161D for avoiding interference with the main supporter 158 may be provided in the upper cover body 161. The front avoidance groove 161D may be formed by cutting a center portion of a lower rear portion of the upper cover body 161.

The front avoidance groove 161D may be provided at a position corresponding to the rear avoidance groove 152D provided in the upper frame 151. The front avoidance groove 161D may configure an open portion, where the main supporter 158 is disposed, along with the rear avoidance groove 152D.

The lower cover body 162 may be connected to a lower portion of the upper cover body 161. The lower cover body 162 may be fastened to the lower frame 153 in front of the lower frame 153.

A horizontal length of the lower cover body 162 may be shorter than a horizontal length of the upper cover body 151.

An anti-deviation part 263 connected to the sub-supporter mounting part 153A provided in the lower frame 153 may be provided at the lower cover body 162. The anti-deviation part 163 may be provided as a pair of anti-deviation parts 163. The anti-deviation parts 163 may protrude from both sides of the lower cover body 162. When the lower cover body 162 is thstened to the lower frame 153, the anti-deviation part 163 may contact a front end portion of the sub-supporter mounting part 153A. Therefore, the anti-deviation part 163 may prevent the sub-supporter 159 mounted on the sub-supporter mounting part 153A from forward deviating therefrom.

Hereinafter, a configuration associated with fastening the inner frame 150 to the inner cover body 160 will be described.

An upper fastening hole 151B may be provided in the main supporter mounting part 151A of the inner frame 150, and an upper through hole 162A corresponding to the upper fastening hole 151B may be provided in the inner cover body 160.

The upper fastening hole 151B may long pass through a region from a front end of the main supporter mounting part 151A to a rear surface of the main frame 150 forward and rearward. The upper through hole 162A may be provided to pass through the inner cover body 160 forward and rearward. A fastening member C2 (see FIG. 7) such as a screw may pass through the upper through hole 162A and may be fastened to the upper fastening hole 151B.

Moreover, a lower fastening hole 154A may be provided in a lower portion of the lower frame 153 of the inner frame 150, and a lower through hole 162C corresponding to the lower fastening hole 154A may be provided in a lower portion of the lower cover body 162.

The lower fastening hole 154A may be disposed more downward than the upper fastening hole 151B, and the lower through hole 162C may be disposed more downward than the upper through hole 162A.

The lower fastening hole 154A may long pass through a lower portion of the lower frame 153 forward and rearward. The lower through hole 162C may be provided to pass through a lower portion of the lower cover body 162 forward and rearward. A fastening member C3 (see FIG. 7) such as a screw may pass through the upper through hole 162C and may be fastened to the lower fastening hole 154A.

Hereinafter, a configuration associated with fastening the front upper body 131 to the rear upper body 132 will be described.

A first hollow portion 131A protruding in a rearward direction may be provided in the front upper body 131, and a second hollow portion 132A protruding in a forward direction may be provided in the rear upper body 132. The first hollow portion 131A and the second hollow portion 132A may be disposed on the same line in a forward-rearward direction. A rear end of the first hollow portion 131A may contact a front end of the second hollow portion 132A. A fastening member C1 such as a screw may pass through one of the first hollow portion 131A and the second hollow portion 132A and may be fastened to the other thereof.

A plurality of avoidance holes 153B and 162B for avoiding interference with at least one of the first hollow portion 131A and the second hollow portion 132A may be provided in the inner frame 150 and the inner cover body 160. In more detail, a rear avoidance hole 153B may be provided to pass through the lower frame 153 of the inner frame 150 forward and rearward. A front avoidance hole 162B corresponding to the rear avoidance hole 153B may be provided to pass through the lower cover body 162 of the inner cover body 160 forward and rearward.

The rear avoidance hole 153B may be disposed between the upper fastening hole 151B and the lower fastening hole 154A in a vertical direction. The front avoidance hole 162B may be disposed between the upper through hole 162A and the lower through hole 162C in a vertical direction.

Hereinafter, a head unit will be described in detail with reference to FIG. 7.

The head unit 109 may include a head 110, a head connector 114, and a head inner frame 117.

The head 110 may be disposed on the body 120.

The head 110 may include a head case 111 and a head cover 112. The head 110 may further include a fastening body 113 which fastens the head case 111 to the head cover 112.

The head case 111 may configure an external appearance of the head 110. The head case 111 may have a shape corresponding to a face and a head of a human body.

The head cover 112 may be fastened to an upper portion of the head case 111. The head cover 112 may have a shape corresponding to a hair style of a human body. In more detail, the fastening body 113 may be fastened to a lower surface of the head cover 112, and the fastening body 113 may be fastened and fixed to the head case 111.

The head connector 114 may be fastened to the body 120. The head connector 114 may connect the head unit 109 to the body 120.

The head connector 114 may include the supporting bar 115 and the head fixing part 116 each described above.

The supporting bar 115 may be provided long in a vertical direction and may correspond to a neck of a human body. The supporting bar 115 may be provided long rom the body 120 to the inside of the head 110.

The head fixing part 116 may be disposed in the body 120. The head fixing part 116 may be connected to a lower end of the supporting bar 115. The head fixing part 116 may be fixed between the body 120 and the inner frame 150 and inner cover body 160.

In more detail, the head fixing part 116 may include a front fixing part connected to a front portion of a lower end of the supporting bar 115 and a rear fixing part connected to a rear portion of the lower end of the supporting bar 115. The front fixing part and the rear fixing part may be spaced apart from each other forward and rearward. The front fixing part may be disposed between the front upper body 131 and the inner cover body 160, and the rear fixing part may be disposed between the rear upper body 132 and the inner frame 150.

The head inner frame 117 may be disposed in the head 110, and in more detail, may be disposed in the head case 111. The head inner frame 117 may include an internal space and a lower surface which is open, and may be provided long in a vertical direction.

At least a portion of the supporting bar 115 may be disposed in the head inner frame 117, and the head inner frame 117 may be connected to the supporting bar 115 so as to be tilted. Also, the head inner frame 117 may be fastened to the head 110. Therefore, the head 110 and the head inner frame 117 may be tilted with respect to the supporting bar 115, and a motion where the figure 100 nods a neck may be implemented.

Figure 8:
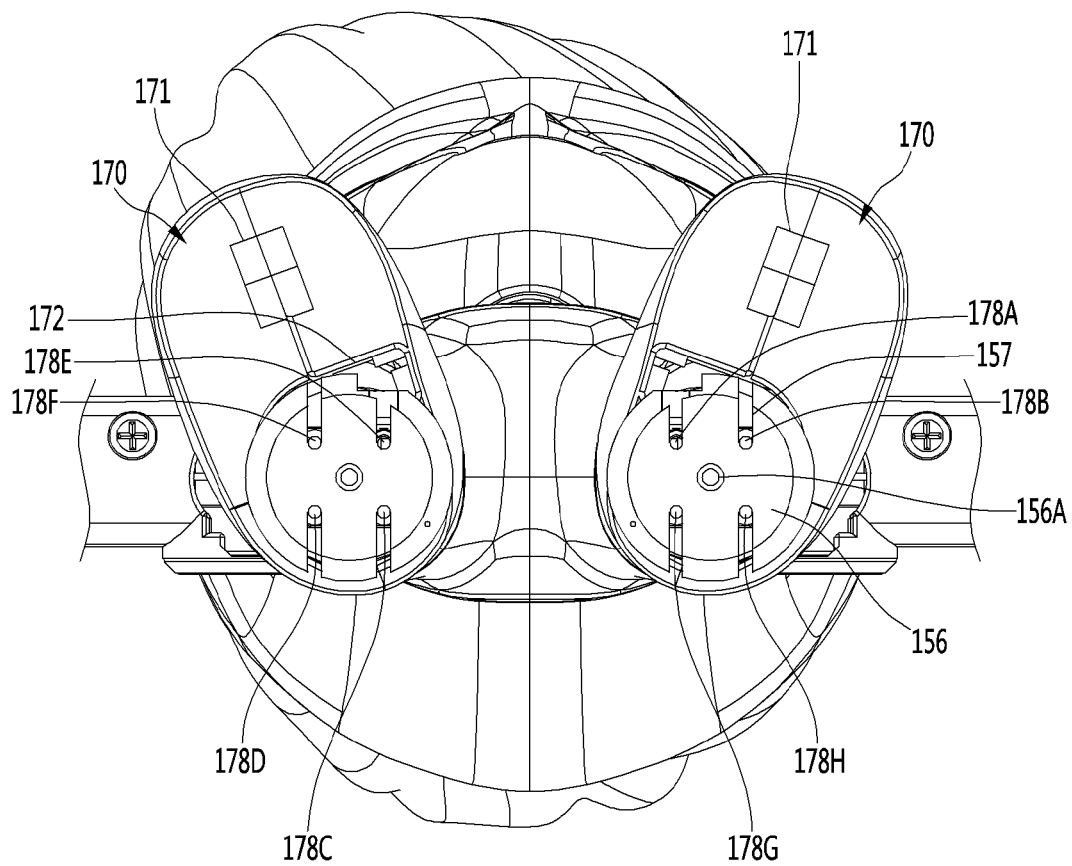
FIG. 8 is a bottom view of a figure according to an embodiment.

FIG. 8 is a bottom view of a figure according to an embodiment.

The base fastening part 156 provided at a lower end of the leg frame 150 may be disposed under the tube 178.

A base fastening hole 156A fastened to the figure base 180 may be provided in the base fastening part 156. The base fastening hole 156A may be provided at a center portion of the base fastening part 156.

A wire avoidance groove 157 which prevents interference by the wire W (see FIG. 9) entering the inside of the tube 178 may be provided in the base fastening part 156. Instead of the wire avoidance groove 157 a wire avoidance hole may be provided.

A lower end of the tube 178 may face the wire avoidance groove 157. Therefore, the wire W may enter the inside of the tube 178 without interfering with the base fastening part 156.

A plurality of wire avoidance grooves 157 may be provided in each led frame 154. The number of wire avoidance grooves 157 may be the same as the number of tubes 178 mounted on the led frame 154. For example, four wire avoidance grooves 157 may be provided in each leg frame 154.

An inserting groove 171 into which the pusher 194 (see FIG. 4) protruding to a portion on the figure base 180 may be provided in a lower surface of the foot 170. The inserting groove 171 may be provided to be recessed from the lower surface to an upper portion of the foot 170. The inserting groove 171 may be provided at a front portion of the lower surface of the foot 170.

Figure 9:
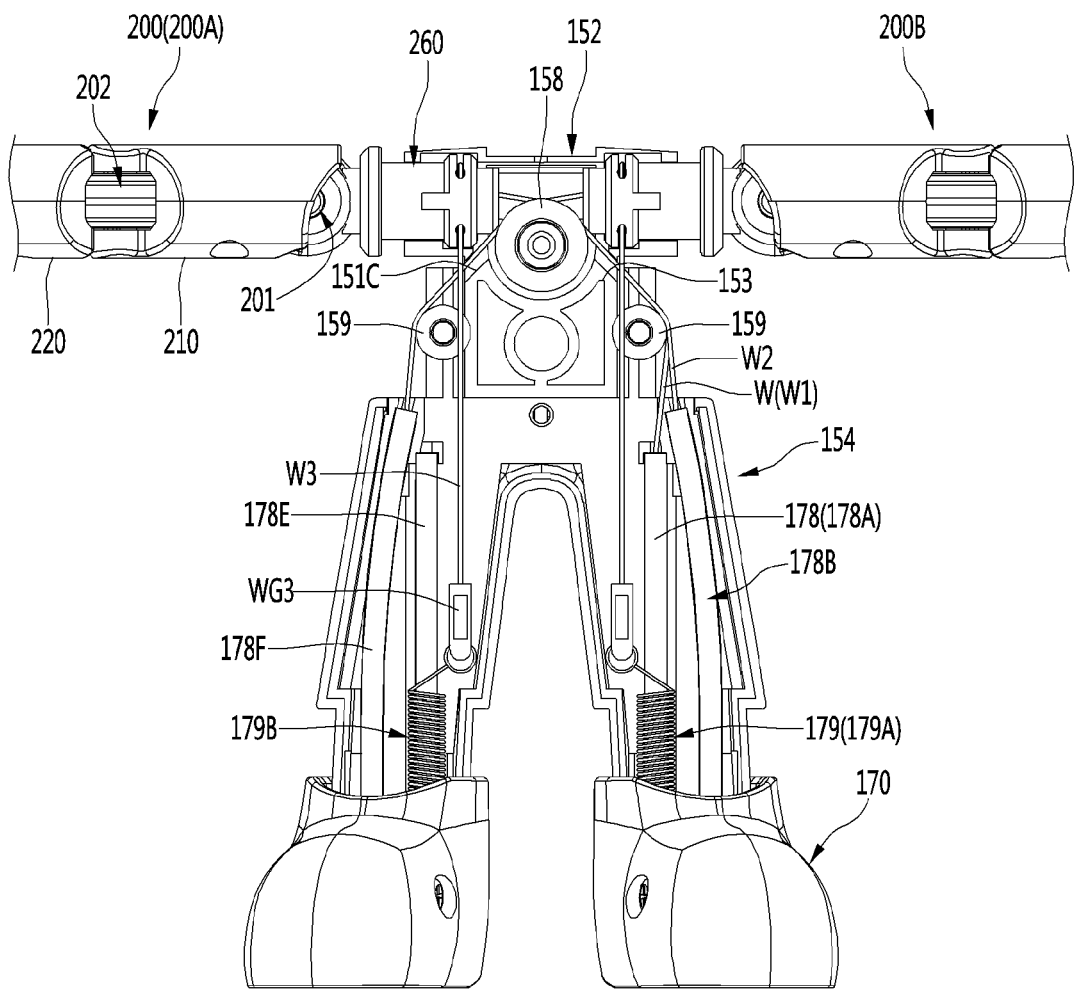
FIG. 9 is a diagram when the inside of a figure according to an embodiment is seen from a front region.
Figure 10:
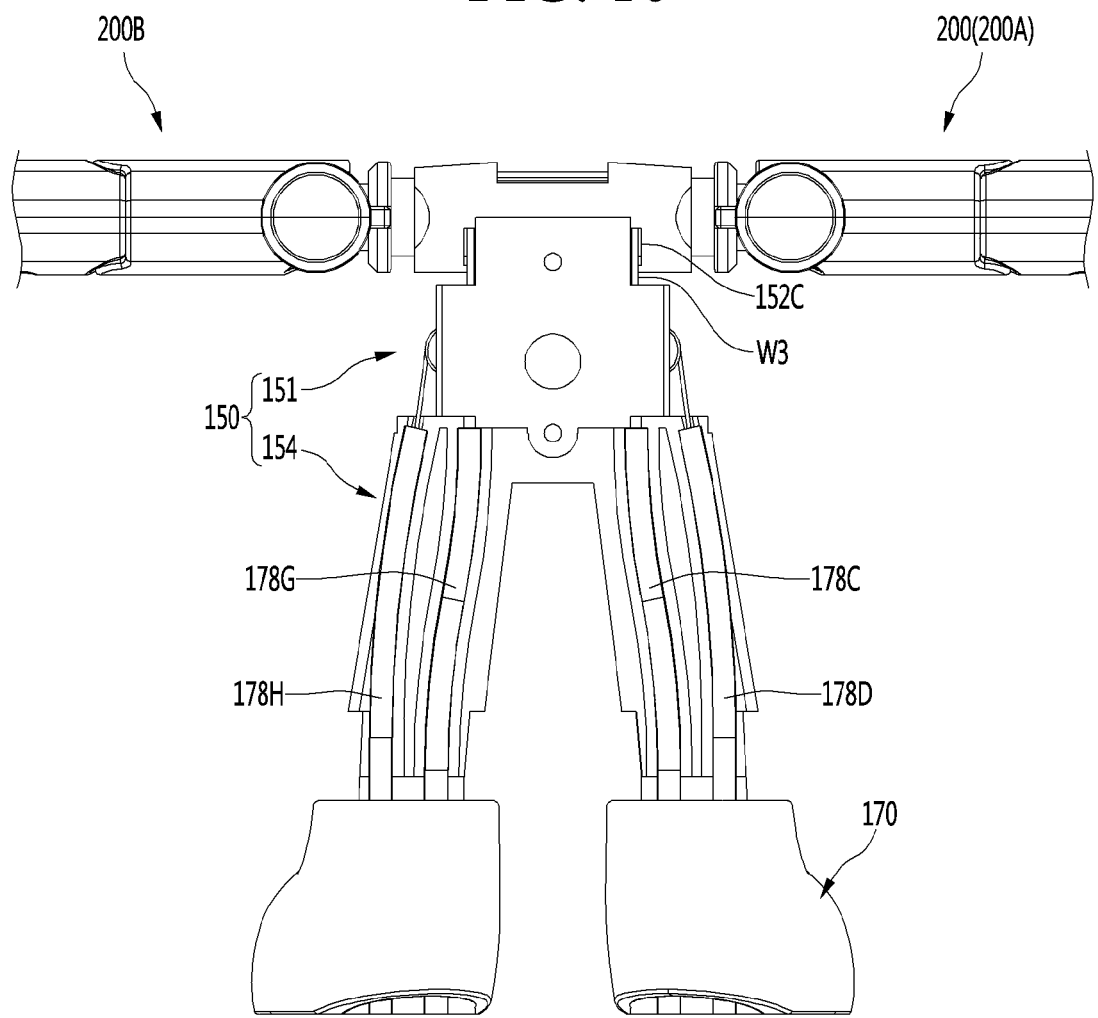
FIG. 10 is a diagram when the inside of a figure according to an embodiment is seen from a rear region.

FIG. 9 is a diagram when the inside of a figure according to an embodiment is seen from a front region, and FIG. 10 is a diagram when the inside of a figure according to an embodiment is seen from a rear region.

The figure 100 may include at least one wire W. A material of the wire W may be changed depending on the case. However, the wire W may include a material having high strength, for minimizing a disconnection of the wire W and enhancing the reliability of a product.

The arm assembly 200 may be connected to the seesaw lever 190 (see FIG. 4) embedded into the figure base 180 by using the wire W passing through the tube 178. The one end portion of the seesaw lever 190 may be lowered and may pull the wire W, thereby driving the figure 100.

In more detail, each of the shoulder joint 201 and the elbow joint 202 of the right arm assembly 200A may be connected to the wire W passing through the tube 178 mounted on the left leg frame 154 among the plurality of tubes 178. The left leg frame 154 may be disposed in the left leg 140B (see FIG. 3).

The connector 260 of the right arm assembly 100A may be connected to the wire W passing through the tube 178 mounted on the right leg frame 154 among the plurality of tubes 178. Also, the wire W may be connected to the elastic member 179B mounted on the right leg frame 154. The right leg frame 154 may be disposed in the right leg 140A (see FIG. 3).

Each of the shoulder joint 201 and the elbow joint 202 of the left arm assembly 200B may be connected to the wire W passing through the tube 178 mounted on the right leg frame 154 among the plurality of tubes 178.

The connector 260 of the left arm assembly 100B may be connected to the wire W passing through the tube 178 mounted on the left leg frame 154 among the plurality of tubes 178. Also, the wire W may be connected to the elastic member 179A mounted on the left leg frame 154.

Hereinafter, for convenience of description, the wire W connected to the right arm assembly 200A will be described mainly. Also, since a configuration of the right arm assembly 100A is symmetrical with that of the left arm assembly 100B, those skilled in the art may easily understand a driving method of the left arm assembly 200B.

A first wire W1 a second wire W2, and a third wire W3 may be connected to the arm assembly 200 according to the present embodiment.

The first wire W1 may be connected to the upper arm part 210 or the shoulder joint 201 of the arm assembly 200. The first wire W1 may pull the upper arm part 210 or the first shoulder joint 201 in a direction in which the shoulder joint 201 is bent.

The second wire W2 may be connected to the lower arm part 220 or the elbow joint 202 of the arm assembly 200. The second wire W2 may pull the lower arm part 220 or the elbow joint 202 in a direction in which the elbow joint 202 is bent.

The third wire W3 may be connected to the connector 260 of the arm assembly 200. The third wire W3 may downward pull the connector 260 at a position which is eccentric with respect to a rotational shaft of the connector 260. That is, the third wire W3 may rotate the connector 260 in one direction or the other direction.

That is, the first wire W1 and the second wire W2 may rotate the joints 201 and 202. The third wire W3 may rotate the connector 260. Therefore, each of the first and second wires W1 and W3 may be referred to as a joint wire, and the third wire W3 may be referred to as a connector wire.

The first wire W1 may pass through one tube 178 disposed in a leg opposite to the arm assembly 200. The second wire W2 may pass through the other one tube 178 disposed in the leg opposite to the arm assembly 200. The third wire W3 may pass through one tube 178 disposed in a leg disposed at the same side as the arm assembly 200.

That is, the first wire W1 and the second wire W2 each connected to the right arm assembly 200A may pass through the tube 178 disposed in the left leg frame 154. Also, the third wire W3 connected to the right arm assembly 200A may pass through the tube 178 disposed in the right leg frame 154.

For example, the first wire W1 connected to the right arm assembly 200A may pass through the first tube 178A and may be connected to the shoulder joint 201 or the upper arm part 210. The first wire W1 may be supported in contact with the sub-supporter 157 and the main supporter 158.

The second wire W2 connected to the right arm assembly 200A may pass through the second tube 178B and may be connected to the elbow joint 202 or the lower arm part 220. The second wire W2 may be supported in contact with the sub-supporter 157 and the main supporter 158.

The third wire W3 connected to the right arm assembly 200A may sequentially pass through the third tube 178C, the rear hole 152C, and the front hole 161C (see FIG. 6) and may be connected to the second elastic member 179B. A portion between the rear hole 152C and the front hole 161C may be connected to the connector 260 in a lengthwise direction of the third wire W3.

On the other hand, the first wire W1 and the second wire W2 each connected to the left arm assembly 200B may pass through the tube 178 disposed in the right leg frame 154. Also, the third wire W3 connected to the left arm assembly 200B may pass through the tube 178 disposed in the left leg frame 154.

For example, the first wire W1 connected to the left arm assembly 200B may pass through the sixth tube 178F and may be connected to the shoulder joint 201 or the upper arm part 210. The first wire W1 may be supported in contact with the sub-supporter 157 and the main supporter 158.

The second wire W2 connected to the left arm assembly 200B may pass through the fourth tube 178D and may be connected to the elbow joint 202 or the lower arm part 220. The second wire W2 may be supported in contact with the sub-supporter 157 and the main supporter 158.

The third wire W3 connected to the left arm assembly 200B may sequentially pass through the seventh tube 178G, the rear hole 152C, and the front hole 161C (see FIG. 6) and may be connected to the first elastic member 179A. A portion between the rear hole 152C and the front hole 161C may be connected to the connector 260 in the lengthwise direction of the third wire W3.

The third wire W3 may be connected to the elastic member 179 by a wire connector WG3. However, the third wire W3 may be directly connected to the elastic member 179.

Figure 11A:
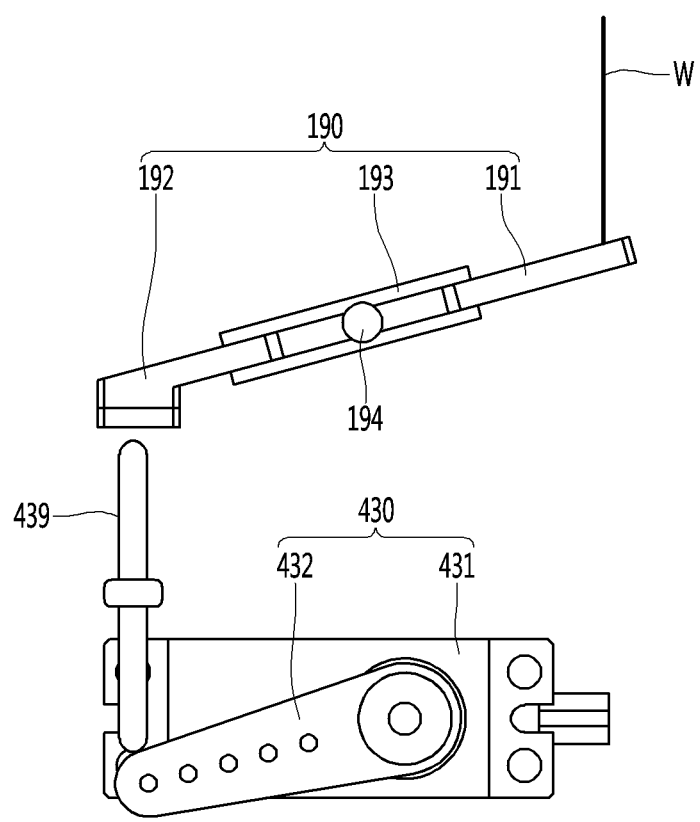
FIGS. 11A and 11B are diagrams for describing an action where a wire according to an embodiment is pulled.
Figure 11B:
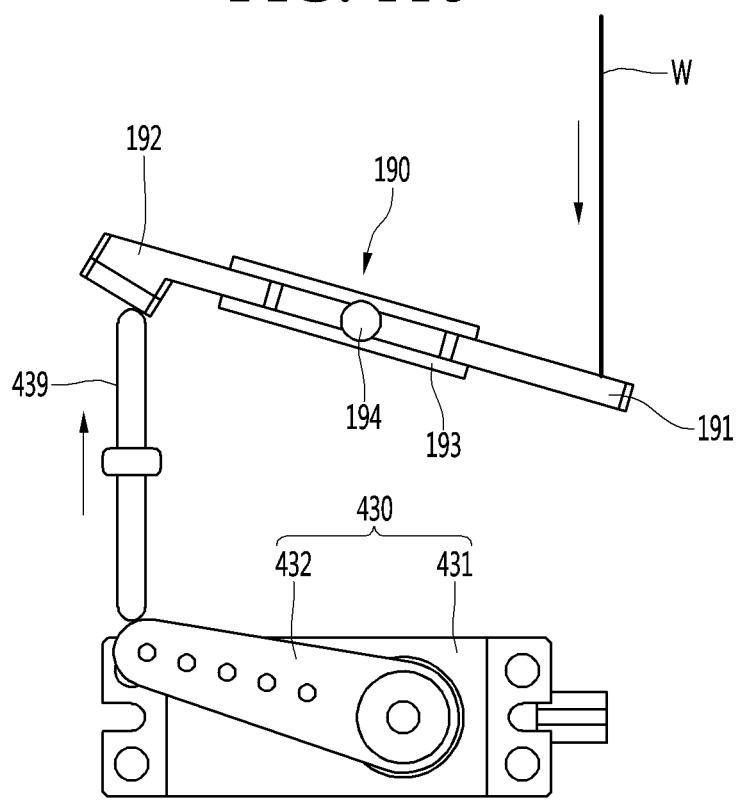

FIGS. 11A and 11B are diagrams for describing an action where a wire according to an embodiment is pulled. In more detail, FIG. 11A is a diagram illustrating a state where a wire is not pulled, and FIG. 11B is a diagram illustrating a state where a wire is pulled downward.

The above-described driving module 400 (see FIG. 2) may include a lift 430 and a load 439.

The lift 430 may be disposed under the figure base 180 (see FIG. 2).

The lift 430 may raise the load 439. In more detail, the lift 430 may include a motor 431 and a lever 432 which is connected to the motor 431 to rotate and to upward pressurize the load 439.

The load 439 may be provided long in a vertical direction. A lower end of the load 439 may be upward pressurized by the lever 432, and an upper end of the load 439 may be upward pressurized by the seesaw lever 190.

As described above, the seesaw lever 190 may be embedded into the figure base 180 (see FIG. 2).

The seesaw lever 190 may include a first lever part 191, a second lever part 192, and a center portion 193.

The wire W may be connected to the first lever 191. The first lever part 191 may include one end portion of the seesaw lever 190. The first lever part 191 may extend in one direction from the center portion 193.

The second lever part 192 may be pressurized by the load 439. The second lever part 192 may include the other end portion of the seesaw lever 190. The second lever part 192 may extend from the center portion 193 in a direction opposite to the first lever part 191.

The center portion 193 may be disposed between the first lever part 191 and the second lever part 192. The center portion 193 may connect the first lever part 191 to the second lever part 192. A rotational shaft 194 may be provided at the center portion 193. The seesaw lever 190 may rotate about the rotational shaft 194 to operate like seesaw.

When the lift 430 raises the load 439, an upper end of the load 439 may upward pressurize the second lever part 192, and the seesaw lever 190 may rotate about the rotational shall. That is, the second lever part 192 may be raised, and the first lever part 191 may be lowered. Therefore, the wire W connected to the first lever part 191 may be pulled downward.

Figure 12:
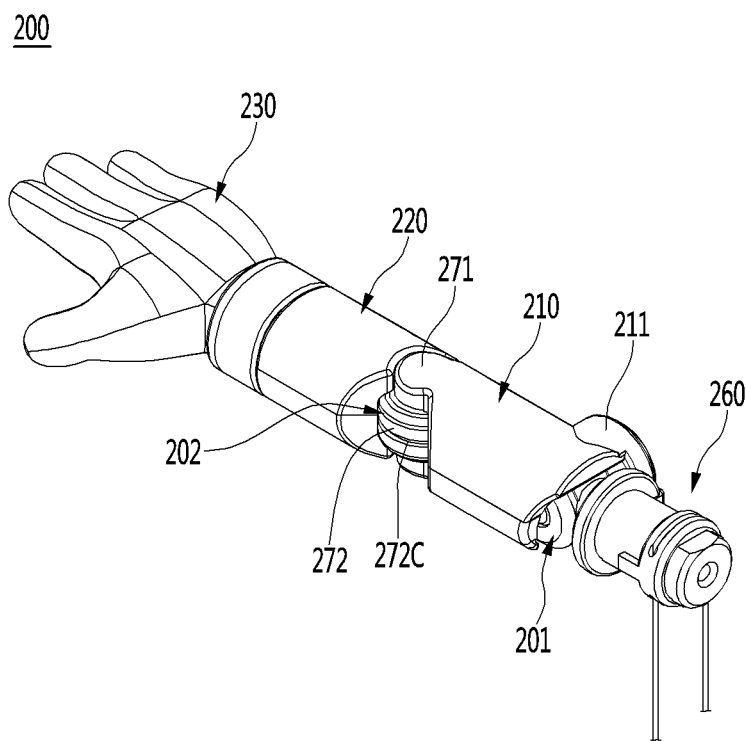
FIG. 12 is a perspective view of an arm assembly according to an embodiment.
Figure 13:
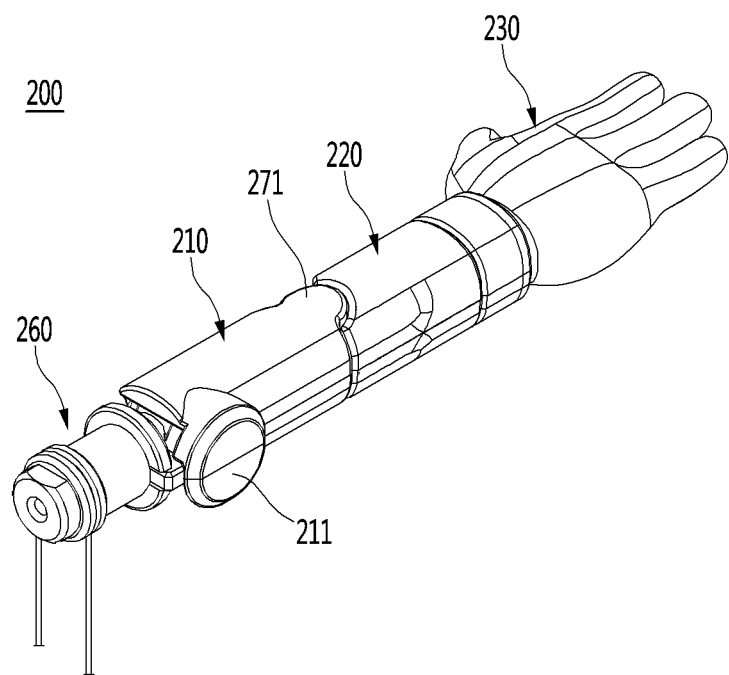
FIG. 13 is a diagram when an arm assembly according to an embodiment is seen from a rear region.
Figure 14:
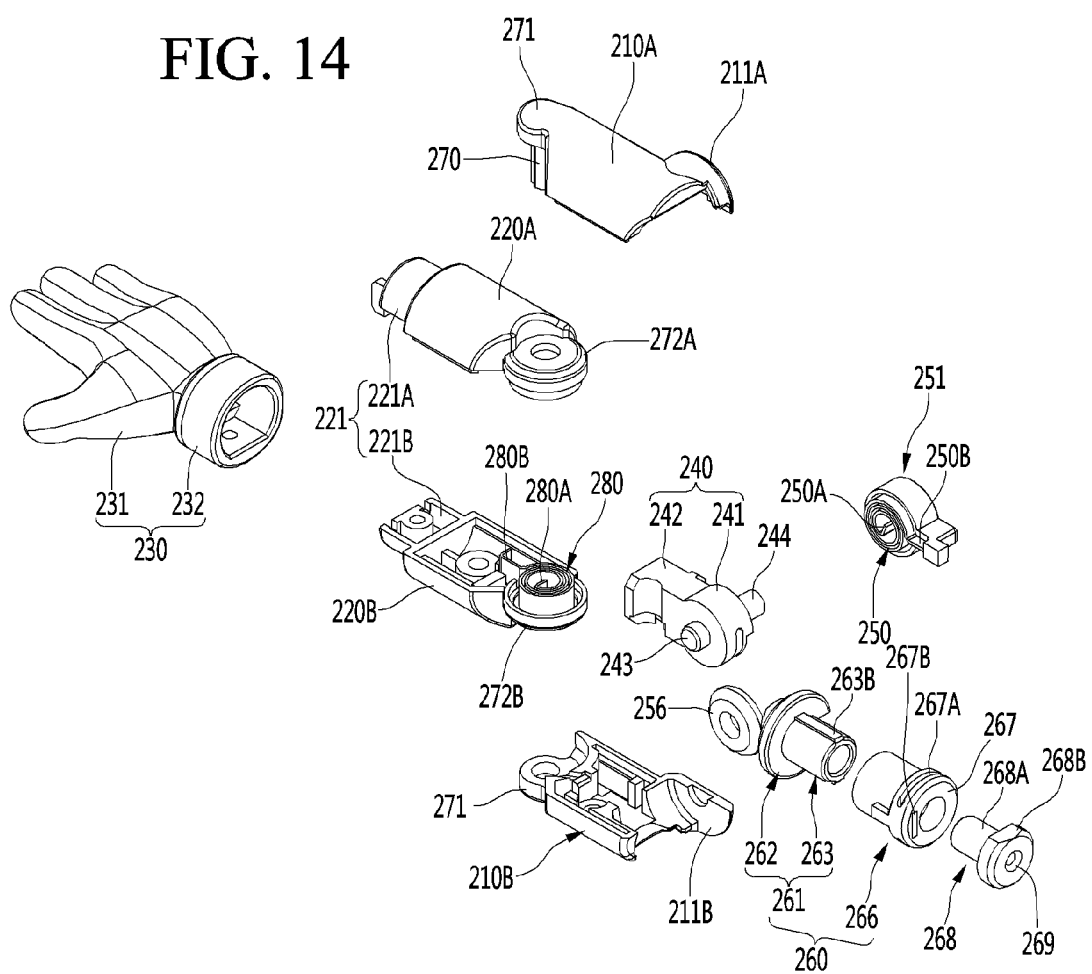
FIG. 14 is an exploded perspective view of an arm assembly according to an embodiment.

FIG. 12 is a perspective view of an arm assembly according to an embodiment, FIG. 13 is a diagram when an arm assembly according to an embodiment is seen from a rear region, and FIG. 14 is an exploded perspective view of an arm assembly according to an embodiment.

An arm assembly 200 may include an upper arm part 210, a lower arm part 220, a hand part 230, a shoulder joint 201, an elbow joint 202, a shoulder elastic member 250, an elbow elastic member 280, and a connector 260.

Considering a case where the figure 100 has a shape which is not a shape of a person, the upper arm part 210, the lower arm part 220, the hand part 230, the shoulder joint 201 the elbow joint 202, the shoulder elastic member 250, and the elbow elastic member 280 may be respectively referred to as a first movable part, a second movable part, a first joint, a second joint, a first elastic member, and a second elastic member. Also, the connector 260 may be rotatably fastened to a body 120, and thus, may be referred to as a third movable part.

The upper arm part 210 may correspond to a portion between a shoulder and an elbow in an arm of a person.

The upper arm part 210 may have a circular bar shape which is provided long in approximate one direction.

The upper arm part 210 may include a first upper arm part 210A and a second upper arm part 210B which are detachably fastened to each other. Each of the first upper arm part 210A and the second upper arm part 210B may be provided long in a lengthwise direction of the upper arm part 210.

A cover part 211 which covers a below-described spring accommodating cover 251 may be provided in the upper arm part 210. The cover part 211 may be provided to protrude in a rearward direction from a side end portion of the body 120 (see FIG. 2) of the upper arm part 210.

The cover part 211 may include a first cover part 211A and a second cover part 211B which are detachably fastened to each other. The first cover part 211A may be provided in the first upper arm part 210A, and the second cover part 211B may be provided in the second upper arm part 210B.

The lower arm part 220 may correspond to a portion between an elbow and a wrist in an arm of a person.

The lower arm part 220 may have a circular bar shape which is provided long in approximate one direction.

The lower arm part 220 may include a first lower arm part 220A and a second lower arm part 220B which are detachably fastened to each other. Each of the first lower arm part 220A and the second lower arm part 220B may be provided long in a lengthwise direction of the lower arm part 220.

A hand mounting part 221 with the hand part 230 mounted thereon may be provided in the lower arm part 220. The hand mounting part 221 may be provided at an outer end portion of the lower arm part 220.

The hand part 230 may correspond to a hand and a wrist of a person. In more detail, the hand part 230 may include a hand 231 and a wrist 232 connected to the hand 231.

The wrist 232 may have an approximately hollow cylindrical shape. An external diameter of the wrist 232 may be equal or similar to that of the lower arm part 220.

The hand 231 may be connected to one surface of the wrist 232, and the hand mounting part 221 of the lower arm part 220 may be fastened to an opposite surface. The hand mounting part 221 may be inserted into and fastened to the wrist 232.

The shoulder joint 201 may rotate the upper arm part 210 with respect to the body 120 (see FIG. 2). In more detail, the shoulder joint 201 may rotate the upper arm part 210 with respect to the connector 260.

The upper arm part 210 may rotate based on the shoulder joint 201 to open or close an armpit.

The shoulder joint 201 may include a rotational body 240, a plurality of shoulder joint shafts 243 and 244, a joint shaft supporting part 256, and a spring accommodating, cover 251.

The rotational body 240 may be fastened to the upper arm part 210. The rotational body 240 may be disposed between the first upper arm part 210A and the second upper arm part 210B. At least a portion of the rotational body 240 may be embedded into the upper arm part 210. The rotational body 240 may rotate along with the upper arm part 210.

The rotational body 240 may include a rotational part 241 including the shoulder joint shafts 243 and 244 and an upper arm fastening part 242 connected to the rotational part 241 and the upper arm part 210.

The rotational part 241 may have a cylindrical shape which is disposed in an approximately forward-rearward direction. That is, a diameter of the rotational part 241 may be provided to be round. A front surface and a rear surface of the rotational part 241 may be provided in order for the shoulder joint shafts 243 and 244 to protrude.

The rotational part 241 may be disposed between the joint shaft supporting part 256 and the spring accommodating cover 251 in a forward-rearward direction.

A recessed portion (not shown) which is forward recessed may be provided in a rear surface of the rotational part 241, and a portion of the shoulder elastic member 250 may be disposed at the recessed portion.

The upper arm fastening part 242 may be provided in a direction from a perimeter of the rotational part 241 to the lower arm part 220. The upper arm fastening part 242 may be provided as one body with the rotational part 241, but is not limited thereto.

The upper arm fastening part 242 may be fastened to the upper arm part 210. In more detail, the upper arm fastening part 242 may be fitted into and fitstened to a portion between the first upper arm part 210A and the second upper arm part 210B.

The shoulder joint shafts 243 and 244 may be provided to forward and rearward protrude from the rotational body 240. The rotational body 240 may rotate about the shoulder joint shafts 243 and 244.

The shoulder joint shafts 243 and 244 may include a first shaft 243 and a second shaft 244.

The first shaft 243 may protrude from one surface of the rotational body 240. In more detail, the first shaft 243 may forward protrude from a front surface of the rotational part 241. The first shaft 243 may be connected to and supported by the joint shaft supporting part 256.

The second shaft 244 may protrude from the other surface of the rotational body 240. In more detail, the second shaft 244 may rearward protrude from a rear surface of the rotational part 241. In more detail, the second shaft 244 may rearward protrude from the inside of the recessed portion provided in the rear surface of the rotational part 241. The second shaft 244 may be connected to the shoulder elastic member 250 and may be supported by the spring accommodating cover 251.

The joint shaft supporting part 256 may have an approximately circular ring shape. The joint shaft supporting part 256 may rotatably support the shoulder joint shafts 243 and 244 at one side of the rotational body 240.

The joint shaft supporting part 256 may be disposed in front of the rotational body 240 (in more detail, the rotational part 241). The first shaft 243 may be inserted into the joint shaft supporting part 256.

The joint shaft supporting part 256 may be provided as one body with a first connecting body 261. However, the present embodiment is not limited thereto, and the joint shaft supporting part 256 may be fastened to the first connecting body 261.

The shoulder elastic member 250 may provide an elastic force in a direction in which the shoulder joint 201 is opened.

The shoulder elastic member 250 may be disposed behind the rotational body 240 (in more detail, the rotational part 241). The first shaft 243 may be inserted into the joint shaft supporting part 256. The shoulder elastic member 250 may be connected to the shoulder joint shafts 243 and 244, and in more detail, may be connected to the second shaft 244.

The shoulder elastic member 250 may be a spiral spring. In this case, an inner end portion 250A of the shoulder elastic member 250 may be connected to the shoulder joint shafts 243 and 244. Also, an outer end portion 250B of the shoulder elastic member 250 may be fixed to at least one of the spring accommodating cover 251 and the first connecting body 261. The inner end portion 250A may be disposed at a center portion of a spiral shape, and the outer end portion 250B may be provided to outward protrude from a spiral shape.

The shoulder elastic member 250 may be embedded into the spring accommodating cover 251.

The spring accommodating cover 251 may rotatably support the shoulder joint shafts 243 and 244 at the other side of the rotational body 240.

In more detail, the spring accommodating cover 251 may rotatably support the second shaft 244. The spring accommodating cover 251 may be disposed behind the rotational body 240 (in more detail, the rotational part 241). The spring accommodating cover 251 may cover the shoulder elastic member 250 from a rear region and may support the shoulder joint shafts 243 and 244.

The elbow joint 202 may rotate the lower arm part 220 with respect to the upper arm part 210. The lower arm part 220 may rotate based on the elbow joint 202 to fold or unfold an elbow.

The elbow joint 202 may include an outer joint part 271, an inner joint part 272, and an elbow joint shaft 270.

The outer joint part 271 may be provided in one of the upper arm part 210 and the lower arm part 220 and the inner joint part 272 may be provided in the other of the upper arm part 210 and the lower arm part 220. Hereinafter, a case where the outer joint part 271 is provided in the upper arm part 210 and the inner joint part 272 is provided in the lower arm part 220 will be described for example.

The outer joint part 271 may be provided at a side end portion of the lower arm part 220 among both end portions of the upper arm part 210. The outer joint part 271 may be provided as one body with the upper arm part 210, but is not limited thereto.

The outer joint part 271 may have a discal shape which is provided to be outward convex.

The outer 1 joint part 271 may be provided in a pair of outer joint parts 271 which are spaced apart from each other. In more detail, one of the pair of outer joint parts 271 may be provided in the first upper arm part 210A, and the other may be provided in the second upper arm part 210B.

The inner joint part 272 may be provided at a side end portion of the upper arm part 210 among both end portions of the lower arm part 220. The inner joint part 272 may be provided as one body with the lower arm part 220, but is not limited thereto.

The inner joint part 272 may have an approximately circular ring or hollow cylindrical shape.

The inner joint part 272 may be disposed between the pair of outer joint parts 271.

The inner joint part 272 may include a first inner joint part 272A and a second inner joint part 272B which are detachably fastened to each other. In more detail, the pair of inner joint parts 272 may include a first inner joint part 272A provided in the first lower arm part 220A and a second inner joint part 272B provided in the second lower arm part 220B.

The elbow joint shaft 270 may pass through the inner joint part 272 and may connect the pair of outer joint parts 271.

The elbow joint shaft 270 may be provided to protrude from one of the pair of outer joint parts 271 to the other thereof. The lower arm part 220 and the inner joint part 272 connected thereto may rotate about the elbow joint shaft 270.

The elbow elastic member 280 may provide an elastic force in a direction in which the elbow joint 202 is opened.

The elbow elastic member 280 may be embedded into the inner joint part 272. That is, the elbow elastic member 280 may be disposed between the first inner joint part 272A and the second inner joint part 272B.

The elbow elastic member 280 may be connected to the elbow joint shaft 270.

The elbow elastic member 280 may be a spiral spring. In this case, an inner end portion 280A of the elbow elastic member 280 may be connected to the elbow joint shaft 270. Also, an outer end portion 280B of the elbow elastic member 280 may be fixed to the lower arm part 220. The inner end portion 280A may be disposed at a center portion of a spiral shape, and the inner end portion 280B may be provided to outward protrude from a spiral shape.

The connector 260 may rotatably connect the arm assembly 200 to the body 120 (see FIG. 2). The connector 260 may be connected to at least one of the shoulder joint 202 or the upper arm part 210. An action where the arm assembly 200 turns an arm or forward or rearward stretches out the arm while rotating wholly may be performed based on the connector 260.

The connector 260 may include a first connecting body 261 and a second connecting body 266 connected to the first connecting body 261.

The first connecting body 261 may be connected to at least one of the shoulder joint 202 and the upper arm part 210. The above-described joint shaft supporting part 256 may be included in the first connecting body 261.

In more detail, the first connecting body 261 may include a first part 261 and a second part 263 which is connected to the first part 262 and is fastened to the second connecting body 266.

One surface of the first part 262 may face the upper arm part 210, and the other surface thereof may face the body 120. The one surface of the first part 262 may be connected to the joint shaft supporting part 256, and the other surface thereof may be connected to the second part 263.

The second part 263 may have an approximately hollow cylindrical shape. The second part 263 may protrude in a direction from the first part 262 to the body 120. The second part 263 may be provided as one body with the first part 262, but is not limited thereto.

An anti-rotation part 263B for preventing a relative rotation from occurring between the second part 263 and the second connecting body 266 may be provided on an outer surface of the second part 263. The anti-rotation part 263B may be provided to protrude a radius outward direction from an outer perimeter of the second part 263.

An anti-rotation groove (not shown) into which the anti-rotation part 263B is inserted may be provided in an inner surface of the second connecting body 266. Therefore, the second connecting body 266 and the first connecting body 261 may rotate together.

The second connecting body 266 may have an approximately hollow cylindrical shape. The second connecting body 266 may be fastened to the second part 263 of the first connecting body 261. The second part 263 may be inserted into the second connecting body 266, and thus, may be fastened thereto.

A large diameter part 267 may be provided in the connector 260 (in more detail, the second connecting body 266). The large diameter part 267 may extend in a radius outward direction from an outer perimeter of the second connecting body 266. The large diameter part 267 may be provided at a side end portion of the body 120 (see FIG. 2) of the second connecting body 266.

A wire groove 267A which is provided long in a perimeter direction of the large diameter part 267 may be provided in the large diameter part 267. The above-described third wire W3 may be hung on the wire groove 267A.

Moreover, a fixing groove 267B which communicates with the wire groove 267A and through which the third wire W3 passes may be provided in one surface of the second connecting body 266. The one surface may be a surface facing the body 120.

The arm assembly 200 may further include a fastening member 268 fastened to the connector 260.

The fastening member 2268 may be fastened to the second connecting body 266. The fastening member 268 may prevent the third wire W3 from slipping with respect to the connector 260. Also, the fastening member 268 may fasten the second connecting body 266 to the first connecting body 261.

The fastening member 268 may include a body part 268A fastened to the second connecting body 268 and a head part 268B which is connected to the body part 268A and contacts the one surface of the second connecting body 266.

The head part 268B of the fastening member 268 may contact the one surface of the second connecting body 266 and may pressurize the wire W3 passing through the fixing groove 267B. Therefore, slip may not occur between the third wire W3 and the connector 260, and the third wire W3 may smoothly rotate the connector 260.

A wire path 269 throud which the wire W passes may be provided in the fastening member 268. The wire path 269 may long pass through a region from the head part 268B to the body part 268B. That is, the wire path 269 may be provided long in a lengthwise direction of the fastening member 268.

The wire path 269 may communicate with a hollow portion of the connector 260. The above-described first and second wires W1 and W2 may pass through the wire path 269 and the hollow portion of the connector 260 and may respectively pull the upper arm part 210 and the lower arm part 220. Therefore, the fastening member 268 may be referred to as a wire guide.

Figure 15:
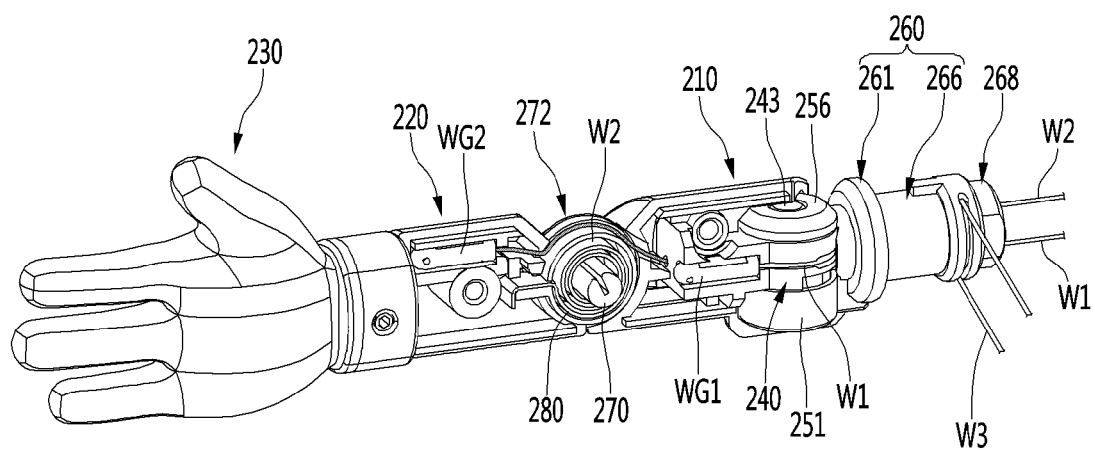
FIG. 15 is a diagram illustrating the inside of an arm assembly according to an embodiment.
Figure 16:
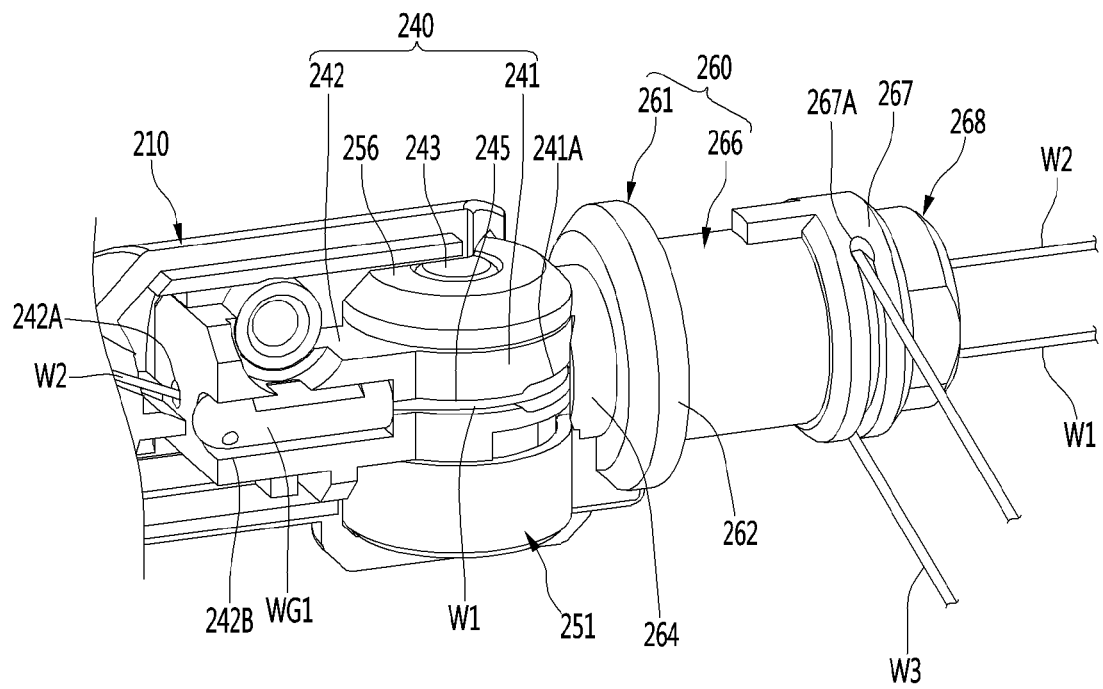
FIG. 16 is an enlarged view of a periphery of a first wire fixing member of the arm assembly illustrated in FIG. 15.
Figure 17:
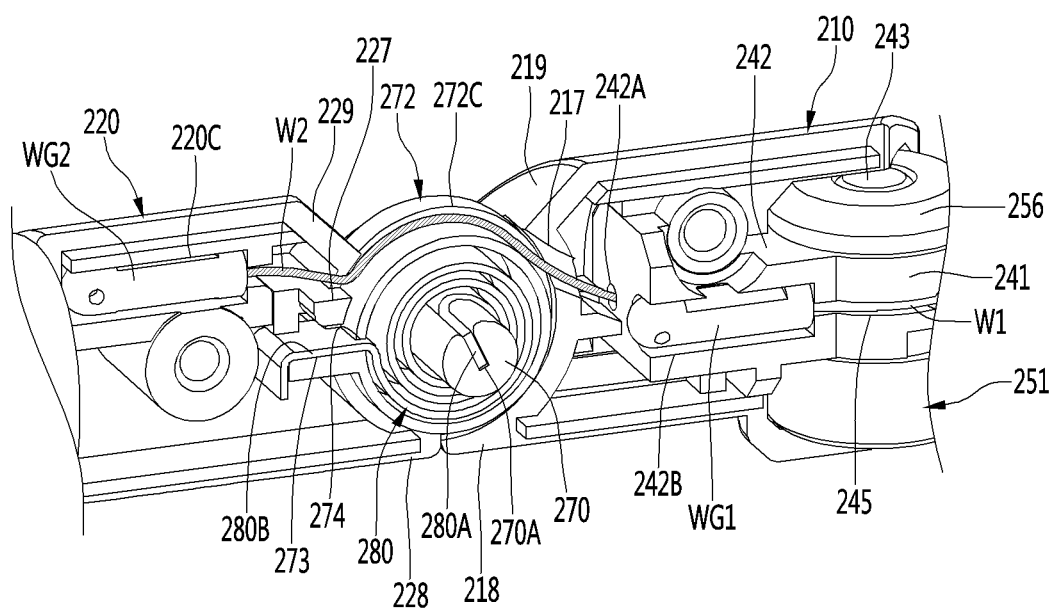
FIG. 17 is an enlarged view of a periphery of a second wire fixing member of the arm assembly illustrated in FIG. 15.

FIG. 15 is a diagram illustrating the inside of an arm assembly according to an embodiment. FIG. 16 is an enlarged view of a periphery of a first wire fixing member of the arm assembly illustrated in FIG. 15, FIG. 17 is an enlarged view of a periphery of a second wire fixing member of the arm assembly illustrated in FIG. 15, FIG. 18 is a cross-sectional view when an arm assembly according to an embodiment is cut in a direction vertical to a rotational shaft of a shoulder joint, and FIG. 19 is a cross-sectional view when an arm assembly according to an embodiment is cut in a direction vertical to a rotational shaft of an elbow joint.

Figure 18:
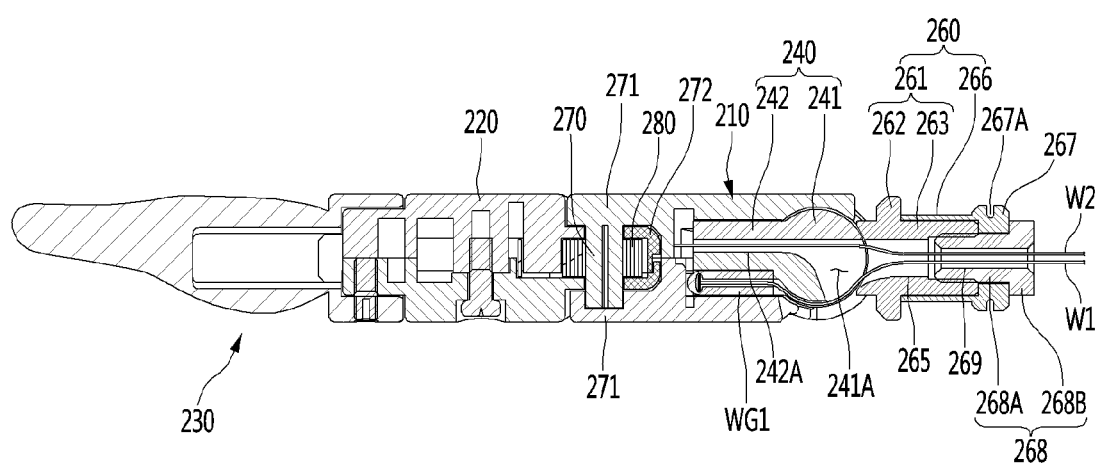
FIG. 18 is a cross-sectional view when an arm assembly according to an embodiment is cut in a direction vertical to a rotational shaft of a shoulder joint.
Figure 19:
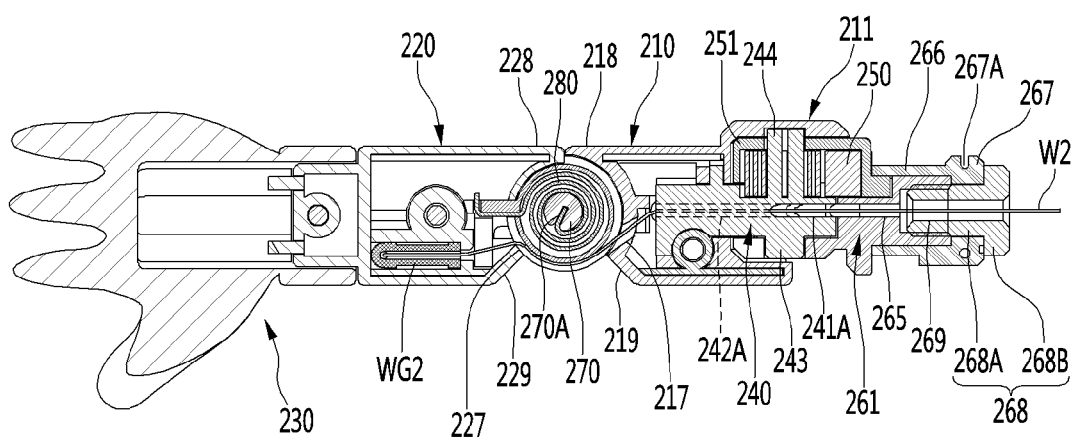
FIG. 19 is a cross-sectional view when an arm assembly according to an embodiment is cut in a direction vertical to a rotational shaft of an elbow joint.

Referring to FIGS. 18 and 19, a rotational shaft of a connector 260 may be vertical to a rotational shaft of a shoulder joint 201 and a rotational shaft of an elbow joint 202. For example, the rotational shaft of the connector 260 may be provided long in a horizontal direction, the rotational shaft of the shoulder joint 201 may be provided long in a forward-rearward direction, and the rotational shaft of the elbow joint 202 may be provided long in a vertical direction.

A first wire W1 and a second wire W2 may be inserted into an arm assembly 200 through a wire path 269 in a body 120 (see FIG. 2).

The wire path 269 may be provided in a thstening member 268. The wire path 269 may be a circular hollow portion which is provided long in a lengthwise direction of the fastening member 268.

A hollow portion 265 communicating with the wire path 269 may be provided in the connector 260. In more detail, the hollow portion 265 may be provided in a first connecting body 261.

A wire avoidance groove 241A and a wire guide hole 242A each communicating with the hollow portion 265 may be provided in a rotational body 240 of a shoulder joint 201.

The wire avoidance groove 241A may be formed as a portion of a perimeter surface of a rotational part 241 is recessed inward. The wire avoidance groove 241A may be formed so that interference does not occur between the second wire W2 and the rotational body 240 when the rotational body 240 rotates. The wire avoidance groove 241A may be provided at a position corresponding to an armpit of a human body.

The wire guide hole 242A may communicate with the wire avoidance groove 241A. The wire guide hole 242A may be provided to pass through a region from the wire avoidance groove 241A to an end portion of an upper arm fastening part 242.

The first wire W1 and the second wire W2 may sequentially pass through the wire path 269 and the hollow portion 265.

The first wire W1 may be connected to a first wire connector WG1 mounted on an upper arm part 210 or the rotational body 240. For example, a mounting groove 242B (see FIG. 16) with the first wire connector WG1 mounted thereon may be provided in a lower portion of an upper arm fastening part 242 of the rotational body 240. The upper arm part 210 may cover the first wire connector WG1 at a lower side.

A first wire guide groove 245 (see FIG. 16) may be provided in an outer surface of the rotational body 240. The first wire guide groove 245 may be provided in a lower surface of the rotational body 240. The first wire guide groove 245 may communicate with the wire avoidance groove 241A. The first wire guide groove 245 may guide the first wire W1, passing through the wire path 269 and the hollow portion 265, to the first wire connector WG1.

When a shoulder joint 201 rotates in a bent direction with a tension of the first wire W1, a shoulder elastic member 250 may be elastically deformed. In more detail, an outer end portion 250B (see FIG. 14) of the shoulder elastic member 250 which is a spiral spring may be maintained with being fixed to at least one of the connector 260 and a spring accommodating cover 251, and an inner end portion 250A thereof may rotate along with the upper arm part 210 with being fitted into a groove 244A provided in a second shaft 244.

When the tension of the first wire W1 is removed, the shoulder joint 201 may be opened by a restoring force of the shoulder elastic member 250.

The upper arm part 210 may include a first limiter 218, and a lower arm part 220 may include a second limiter 228. The first limiter 218 and the second limiter 228 may limit a rotational range of an elbow joint 202.

The first limiter 218 may configure a portion of a side end portion of an elbow joint 202 of the upper arm part 210. The second limiter 228 may configure a portion of a side end portion of an elbow joint 202 of the lower arm part 210.

The first limiter 218 and the second limiter 228 may be disposed outside the elbow joint 202 in a direction in which the elbow joint 202 is bent.

When the elbow joint 202 is bent, the first limiter 218 and the second limiter 228 may be apart from each other. On the other hand, when the elbow joint 202 is fully opened, the first limiter 218 and the second limiter 228 may contact each other. Therefore, like an elbow of a person, a movable range of the elbow joint 202 may be limited.

The upper arm part 210 may include an upper arm inclined portion 219, and the lower arm part 220 may include a lower arm inclined portion 229. The upper arm inclined portion 219 and the lower arm inclined portion 229 may be apart from each other.

The upper arm inclined portion 219 may be provided to be inclined in a direction from an outer perimeter of the upper arm part 210 to an outer perimeter of an inner joint part 272. The lower arm inclined portion 229 may be provided to be inclined in a direction from an outer perimeter of the lower arm part 220 to the outer perimeter of the inner joint part 272.

The upper arm inclined portion 219 may configure a portion of a side end portion of the elbow joint 202 of the upper arm part 210. The lower arm inclined portion 229 may configure a portion of a side end portion of the elbow joint 202 of the lower arm part 220.

Moreover, the upper arm inclined portion 219 and the lower arm inclined portion 229 may be disposed inward from the elbow joint 202 in a direction in which the elbow joint 202 is bent. Therefore, when the elbow joint 202 is bent, the upper arm inclined portion 219 and the lower arm inclined portion 229 may become closer to each other.

Referring to FIG. 17, a second wire guide groove 272C which guides the second wire W2 may be provided in the elbow joint 202.

The second wire guide groove 272C may be provided in an outer perimeter of the inner joint part 272. The second wire guide groove 272C may be provided long in a perimeter direction of the inner joint 272. The second wire guide groove 272C may face a portion between the upper arm inclined portion 219 and the lower arm inclined portion 229. That is, the second wire guide groove 272C may be provided at a portion between the upper arm inclined portion 219 and the lower arm inclined portion 229 in the outer perimeter of the inner joint 272.

A first open groove 217 may be provided in the upper arm part 210, and a second open groove 227 may be provided in the lower arm part 220. The first open groove 217 may communicate the wire guide hole 242A with the second wire guide groove 272C. The second open groove 227 may communicate the second wire guide groove 272C with a mounting groove 220C with a second wire connector WG2 mounted thereon.

That is, the second wire W2 passing through the wire guide hole 242A may sequentially pass through the first open groove 217, the second wire guide groove 272C, and the second open groove 227 and may be connected to the second wire connector WG2.

The first open groove 217 may be provided between the outer perimeter of the inner joint part 272 and the first inclined part 219. The second open groove 227 may be provided between the outer perimeter of the inner joint part 272 and the second inclined part 229.

The mounting groove 220C (see FIG. 17) with the second wire connector WG2 mounted thereon may be provided in the lower arm part 220.

Also, a spring fitting groove 274 through which an outer end portion 280B of the elbow elastic member 280 may be provided in the inner joint part 272. An elbow elastic member pressurizer 273 which pressurizes the outer end portion 280B of the elbow elastic member 280 in a rotational direction of the lower arm part 220 may be provided in the lower arm part 220.

When an elbow joint 202 rotates in a bent direction with a tension of the second wire W2, an elbow elastic member 280 may be elastically deformed. In more detail, an inner end portion 280A (see FIG. 17) of the elbow elastic member 280 may be maintained with being fitted into and fixed to a groove 270A provided in the elbow joint shaft 270, and an outer end portion 280B thereof may be pressurized by the elbow elastic member pressurizer 272 and may rotate along with the lower arm part 220 with being fitted into a spring fitting groove 273 provided in the lower arm part 220.

When the tension of the second wire W2 is removed, the elbow joint 202 may be opened by a restoring force of the elbow elastic member 280.

A wire groove 267A may be provided in an outer perimeter of the connector 260. In more detail, the wire groove 267A may be provided in an outer perimeter of the second connecting body 266. The wire groove 267A may be disposed in the body 120 (see FIG. 2).

The wire groove 267A may be provided long in a perimeter direction of the connector 260. That is, the wire groove 267A may have a circular ring shape.

A third wire W3 may be fitted into the wire groove 267A. The third wire W3 may surround an approximately half of an upper portion of a perimeter of the wire groove 267A.

When the third wire W3 is pulled downward, the connector 260 may rotate with respect to the body 120 (see FIG. 2).

The third wire W3 may be connected to an elastic member 179 (see FIG. 9). In more detail, the third wire W3 may be connected to a third wire connector WG3, and the third wire connector WG3 may be connected to the elastic member 179. Also, the third wire W3 may be directly connected to the elastic member 179.

Hereinafter, an action of the arm assembly 200 will be described.

When the first wire W1 is pulled by a seesaw lever 190 (see FIGS. 11A and 11B), the first wire W1 may pull the upper arm part 210 or the shoulder joint 201, and the upper arm part 210 and the shoulder joint 201 may rotate and may be bent with respect to the connector 260. In this case, an inner end portion 250A of the shoulder elastic member 250 may rotate, and an outer end portion 250B thereof may be fixed, whereby the shoulder elastic member 250 may be elastically deformed.

When the seesaw lever 190 does not pull the first wire W1, the upper arm part 110 and the shoulder joint 201 may rotate based on a restoring force of the shoulder elastic member 250, and thus, may be opened with respect to the connector 260.

When the second wire W2 is pulled by the seesaw lever 190 (see FIGS. 11A and 11B), the second wire W2 may pull the lower arm part 220 or the elbow joint 202, and the lower arm part 220 and the shoulder joint 202 may rotate and may be bent with respect to the upper arm part 210. In this case, an inner end portion 280A of the elbow elastic member 280 may be fixed, and an outer end portion 280A thereof may rotate, whereby the elbow elastic member 280 may be elastically deformed.

When the seesaw lever 190 does not pull the second wire W2, the lower arm part 210 and the elbow joint 202 may rotate based on a restoring force of the elbow elastic member 280, and thus, may be opened with respect to the upper arm part 210.

When the third wire W3 is pulled by the seesaw lever 190 (see FIGS. 11A and 11B), the third wire W3 may rotate the connector 260 in one direction (for example, rearward rotation) with respect to the body 120. In this case, the elastic member (see FIG. 9) may be elastically deformed and may extend.

When the seesaw lever 190 does not pull the third wire W3, the elastic member 179 may be compressed by a restoring force and may pull the third wire W3. Therefore, the third wire W3 may rotate the connector 260 in an opposite direction (for example, forward rotation) with respect to the body 120.

Figure 20:
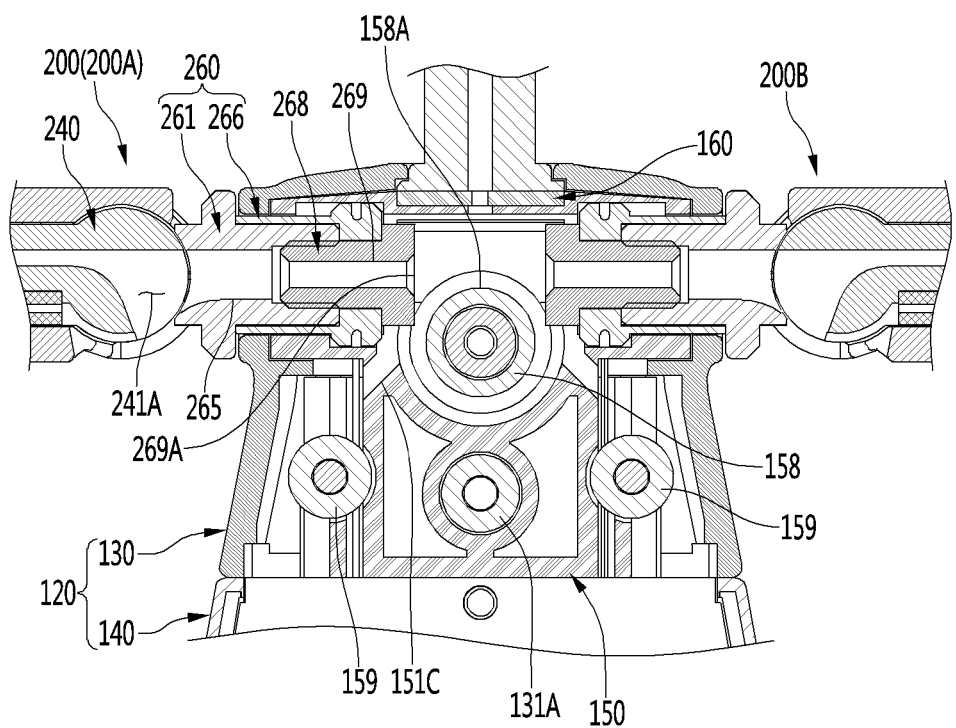
FIG. 20 is a diagram for describing a position relationship between a wire supporter and a connector according to an embodiment of the present disclosure.

FIG. 20 is a diagram for describing a position relationship between a wire supporter and a connector according to an embodiment of the present disclosure.

A wire path 269 provided in a fastening member 268 may include an inlet 269A. The inlet 269A may be disposed in a body 120, and in more detail, may be disposed in an upper body 130.

A first wire W1 and a second wire W2 supported by wire supporters 158 and 159 may be inserted into an arm assembly 200 through the inlet 269A.

A perimeter of the inlet 269A may have a chamfered shape. That is, a corner of the inlet 269A may be provided to be inclined without being sharp. Therefore, a problem where the first wire W1 and the second wire W2 are damaged or disconnected by an edge of the perimeter of the inlet 269A.

An internal diameter of the inlet 269A may be greater than that of the wire path 269. Accordingly, the first wire W1 and the second wire W2 may easily enter the inlet 269A.

An upper end 158 of a main supporter 158 may be disposed between an inlet 269A of a right arm assembly 200A and an inlet 269A of a left arm assembly 200B. With respect to a figure base 180 (see FIG. 2), a height of an upper end 158A of a main supporter 158 may be higher than that of a lower end of the inlet 269A. That is, the upper end 158A of the main supporter 158 may overlap the inlet 269A in a horizontal direction.

The first wire W1 and the second wire W2 may be apart from the main supporter 159 from the upper end 158A of the main supporter 158 approximately. Therefore, the upper end 158A of the main supporter 158 may be disposed to be higher in position than the lower end of the inlet 269A, and thus, the first wire W1 and the second wire W2 may enter the inlet 269A without contacting a corner of the inlet 269A.

The first wire W1 and the second wire W2 may pass through a region between the main supporter 158 and one connector 260 and may enter an inlet 269A provided in the other connector 260. For example, the first wire W1 and the second wire W2 each entering the inlet 269A of the right arm assembly 200A may pass through a region between a connector 260 of the left arm assembly 200B and the main supporter 158.

According to the embodiments, an upper end of a supporter for guiding a wire may overlap an inlet of a wire path in a horizontal direction. Therefore, the wire may enter the inlet without contacting a perimeter of the inlet, and damage of the wire may be prevented.

Moreover, since a supporter is disposed in a body, the wire may be easily guided in the body.

Moreover, the perimeter of the inlet may be chamfered. Accordingly, even when the wire contacts the perimeter of the inlet, damage of the wire may be prevented.

Moreover, an internal diameter of the inlet may be greater than that of a wire path. Accordingly, the wire may easily enter the inlet.

Moreover, an upper end of the supporter may be disposed between inlets of a pair of connectors. Accordingly wire entering each of the inlets may be supported by the supporter, and moreover, each wire may be prevented from contacting a perimeter of a corresponding inlet.

Moreover, a wire may pass through a region between the supporter and one connector and may enter an inlet formed by the other connector. Accordingly, a wire path may be optimized in the body, and thus, the body may be compactly maintained.

Moreover, the supporter may have a roller shape. Accordingly, a wire supported by the supporter may be easily guided without being damaged.

Moreover, a wire may pass through a flexible tube. Accordingly, the tube may guide a wire along a curve path and may protect the wire.

Moreover, the supporter and the tube may be mounted on an inner frame disposed in the body. Accordingly, the supporter and the tube may be easily disposed in the body.

Moreover, some of a plurality of tubes may be mounted on a front portion of the inner frame, and the other some thereof may be mounted on a rear portion of the inner frame. Accordingly, the plurality of tubes may be efficiently disposed in the body which is compact.

Moreover, a guide groove for guiding a wire passing through a tube to the supporter may be provided in the inner frame. Accordingly, the wire passing through the tube may be easily guided to the supporter.

Moreover, an inner cover body may be fastened to the inner frame and may cover the supporter in a front region. Accordingly, a wire may prevent from deviating from the supporter.

Moreover, a guide groove for guiding a wire passing through a tube to the supporter may be provided in the inner cover body. Accordingly, the wire passing through the tube may be easily guided to the supporter.

Moreover, a connector wire for rotating a connector with respect to the body may be apart from the supporter. Accordingly, the connector wire may be prevented from tangling with a wire supported by the supporter.

Moreover, the connector wire and the wire supported by the supporter may pass through different tubes. Accordingly, the connector wire may be prevented from tangling with the wire supported by the supporter.

Moreover, the connector wire may pass through a rear hole provided in the inner frame and a front hole provided in the inner cover body. Accordingly, the connector wire may be easily connected to a connector without bypassing the inner frame and the inner cover body.

Moreover, an elastic member for pulling the connector wire may be disposed to surround a tube. Accordingly, the tube may support the elastic member, and thus, a separate element for supporting the elastic member may not be needed.

Moreover, a sub-supporter disposed between a tube and the supporter may guide a wire. Accordingly, the wire may be more easily guided in the body.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An action robot comprising:
   a connector configured to connect a body to a movable part;
   a joint including a rotational body fastened to the movable part, a joint shaft provided to protrude from the rotational body, and a joint shaft supporting part provided in the connector to have a ring shape, the joint shaft being inserted into the joint shaft supporting part;
   a wire connected to the movable part to pull the movable part in a direction in which the joint is bent;
   a wire path provided in the connector, the wire path including an inlet which is disposed in the body and through which the wire passes; and
   a supporter disposed in the body to support the wire,
   wherein an upper end of the supporter overlaps the inlet in a horizontal direction, and
   wherein the action robot further comprises:
   a tube embedded into the body to guide the wire, the tube including a flexible material; and
   an inner frame disposed in the body, the supporter and the tube being mounted on the inner frame.

2. The action robot of claim 1, wherein a perimeter of the inlet is chamfered.

3. The action robot of claim 1, wherein an internal diameter of the inlet is greater than an internal diameter of the wire path.

4. The action robot of claim 1, wherein
   the connector is provided as a pair of connectors respectively disposed at both sides of the body, and
   the upper end of the supporter is disposed between inlets of the pair of connectors.

5. The action robot of claim 4, wherein the wire passes through a region between the supporter and one of the pair of connectors and enters an inlet provided in the other connector.

6. The action robot of claim 1, wherein the supporter has a roller shape.

7. The action robot of claim 1, wherein
   the tube is provided in plurality, and
   some of the plurality of tubes are mounted on a front portion of the inner frame, and the other some thereof are mounted on a rear portion of the inner frame.

8. The action robot of claim 1, wherein a guide groove for guiding the wire passing through the tube to the supporter is provided in the inner frame.

9. The action robot of claim 1, further comprising an inner cover body fastened to the inner frame to cover the supporter at a front region.

10. The action robot of claim 9, wherein a guide groove for guiding the wire passing through the tube to the supporter is provided in the inner cover body.

11. The action robot of claim 9, further comprising a connector wire configured to rotate the connector with respect to the body.

12. The action robot of claim 11, wherein the connector wire is apart from the supporter.

13. The action robot of claim 11, wherein
the tube is provided in plurality, and
the wire passes through one of the plurality of tubes, and the connector wire passes through one other tube.

14. The action robot of claim 11, wherein
a rear hole through which the connector wire passes is provided in the inner frame, and
a front hole, which is disposed in front of the rear hole and through which the connector wire passes, is provided in the inner cover body.

15. The action robot of claim 14, wherein the connector is connected to a portion of the connector wire between the rear hole and the front hole in a lengthwise direction of the connector wire.

16. The action robot of claim 11, further comprising an elastic member configured to pull the connector wire.

17. The action robot of claim 16, wherein
the tube is provided in plurality, and
the connector wire passes through one of the plurality of tubes, and the elastic member is disposed to surround one other tube.

18. An action robot comprising:
a connector configured to connect a body to a movable part;
a joint including a rotational body fastened to the movable part, a joint shaft provided to protrude from the rotational body, and a joint shaft supporting part provided in the connector to have a ring shape, the joint shaft being inserted into the joint shaft supporting part;
a wire connected to the movable part to pull the movable part in a direction in which the joint is bent;
a wire path provided in the connector, the wire path including an inlet which is disposed in the body and through which the wire passes; and
a supporter disposed in the body to support the wire,
wherein an upper end of the supporter overlaps the inlet in a horizontal direction, and
wherein the action robot further comprises:
a tube embedded into the body to guide the wire, the tube including a flexible material; and
a sub-supporter disposed between the tube and the supporter in a lengthwise direction of the wire to support the wire.

* * * * *